US012597386B2

(12) United States Patent
Ueno et al.

(10) Patent No.: US 12,597,386 B2
(45) Date of Patent: Apr. 7, 2026

(54) CONTROL DEVICE FOR DISPLAY PANEL, DISPLAY DEVICE, AND CONTROL METHOD FOR DISPLAY PANEL

(71) Applicant: SHARP KABUSHIKI KAISHA, Osaka (JP)

(72) Inventors: Masafumi Ueno, Sakai (JP); Masaaki Moriya, Sakai (JP); Naoki Shiobara, Sakai (JP); Masafumi Kawai, Sakai (JP); Mohammad Reza Kazemi, Sakai (JP); Hiroyuki Furukawa, Sakai (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/863,086

(22) PCT Filed: May 10, 2022

(86) PCT No.: PCT/JP2022/019802
§ 371 (c)(1),
(2) Date: Nov. 5, 2024

(87) PCT Pub. No.: WO2023/218525
PCT Pub. Date: Nov. 16, 2023

(65) Prior Publication Data
US 2025/0308445 A1 Oct. 2, 2025

(51) Int. Cl.
*G09G 3/3233* (2016.01)

(52) U.S. Cl.
CPC ... *G09G 3/3233* (2013.01); *G09G 2320/0233* (2013.01); *G09G 2320/0242* (2013.01); *G09G 2320/041* (2013.01); *G09G 2320/045* (2013.01)

(58) Field of Classification Search
CPC .. G09G 3/00; G09G 3/14; G09G 3/20; G09G 3/32; G09G 3/36; G09G 3/3233; G09G 3/3208; G09G 3/3275; G09G 3/3225; G09G 5/00; G09G 5/02; G09G 5/10; G09G 5/18; G09G 2320/041; G09G 2320/045; G09G 2320/0233; G09G 2320/0242; H10K 59/35; H10K 59/122
See application file for complete search history.

(56) References Cited

U.S. PATENT DOCUMENTS

| | | | | |
|---|---|---|---|---|
| 2017/0162103 A1* | 6/2017 | An | ........................ | G09G 3/3208 |
| 2020/0135143 A1* | 4/2020 | Takiguchi | ................ | G09G 5/18 |
| 2023/0395020 A1* | 12/2023 | Xu | ........................ | G09G 3/3233 |
| 2024/0274066 A1* | 8/2024 | Han | ......................... | G09G 3/20 |

FOREIGN PATENT DOCUMENTS

JP 2006-018130 A 1/2006

* cited by examiner

*Primary Examiner* — Chanh D Nguyen
*Assistant Examiner* — Nguyen H Truong
(74) *Attorney, Agent, or Firm* — ScienBiziP, P.C.

(57) ABSTRACT

A control device includes: an accumulation unit that accumulates an influence quantity indicating an influence of display of a red self-light-emitting pixel corresponding to a blue self-light-emitting pixel calculated based on a display amount related to the blue self-light-emitting pixel arranged within a predetermined range with respect to the red self-light-emitting pixel; and a compensation processing unit that generates a correction video signal by compensating for an input video signal relative to a temporal change of the red self-light-emitting pixel based on the influence quantity related to the red self-light-emitting pixel.

13 Claims, 17 Drawing Sheets

(a)

(b)

(c)

CONTROL DEVICE FOR DISPLAY PANEL, DISPLAY DEVICE, AND CONTROL METHOD FOR DISPLAY PANEL

TECHNICAL FIELD

The disclosure relates to a control device for a display panel, a display device, and a control method for a display panel.

BACKGROUND ART

In recent years, various display devices including self-light-emitting elements in self-light-emitting pixels have been actively developed. In particular, a display device in which a self-light-emitting element is, for example, a quantum dot light-emitting diode (QLED) or an organic light-emitting diode (OLED) has attracted a lot of attention because it can achieve low power consumption, thickness reduction, high image quality, and the like.

In the field of display devices including such self-light-emitting elements, a technique for suppressing a decrease in image quality caused by a luminance decrease due to deterioration of the self-light-emitting elements has been developed.

For example, PTL 1 describes accumulating a light emission amount of a partial region including a plurality of self-light-emitting pixels, deciding a correction value based on this accumulated light emission amount and a reference value, and correcting the correction value corresponding to the position in the partial region with the correction value continuously changing between adjoining partial regions.

CITATION LIST

Patent Literature

PTL 1: JP 2006-18130 A

SUMMARY

Technical Problem

The inventors of the disclosure have found that, in an aging test (a test of continuously displaying a burn-in region including a plurality of self-light-emitting pixels for a predetermined time or longer) in a display device including self-light-emitting elements in self-light-emitting pixels, there is a case where a self-light-emitting element included in a self-light-emitting pixel that emits a part of a mixed color (e.g., white, cyan (C), magenta (M), or yellow (Y)) in a region burned in while displaying the mixed color is a larger in temporal change amount (deterioration amount) than a self-light-emitting element included in a self-light-emitting pixel that emits a color same as a single color (e.g. red, green, or blue) in a region burned in while displaying the single color.

The inventors of the disclosure have found that there is a case where a large temporal change (deterioration) occurs also in a self-light-emitting element included in a self-light-emitting pixel that emits a part of the mixed color around a region burned in while displaying the mixed color (e.g., a temporal change (deterioration) such as smearing occurs over a more than a dozen of surrounding pixels).

The method described in PTL 1 does not take into consideration the fact that the temporal change amount (deterioration amount) of the self-light-emitting element included in the self-light-emitting pixel that emits a part of the mixed color in the region burned in while displaying the mixed color is large, or the fact that a large temporal change (deterioration) occurs also in the self-light-emitting element included in the self-light-emitting pixel that emits a part of the mixed color around the region burned in while displaying the mixed color, which has been found by the inventors of the disclosure, and therefore, there is a problem of being not able to perform correction highly accurately reflecting the temporal change (deterioration) due to the influence of an adjacent pixel.

One aspect of the disclosure has been made in view of the above problem, and an object of the disclosure is to provide a control device for a display panel that can perform correction highly accurately reflecting a level of temporal change (deterioration) due to the influence of an adjacent pixel, and a control method for the display panel.

Solution to Problem

To solve the above problem, a control device of the disclosure is a control device for a display panel including a plurality of first self-light-emitting pixels that output first color light and a plurality of second self-light-emitting pixels that output second color light different from the first color light, in which the plurality of first self-light-emitting pixels are arranged, within a predetermined range, respectively corresponding to the second self-light-emitting pixel that corresponds among the plurality of second self-light-emitting pixels, and the control device includes an accumulation unit configured to accumulate an influence quantity calculated based on a display amount related to the first self-light-emitting pixel arranged within the predetermined range with respect to the second self-light-emitting pixel, the influence quantity indicating an influence of display of a second self-light-emitting pixel corresponding to the first self-light-emitting pixel, and a compensation processing unit configured to generate a correction video signal by compensating for an input video signal relative to a temporal change of each of the second self-light-emitting pixels based on the influence quantity related to each of the plurality of second self-light-emitting pixels.

To solve the above problem, a control method for a display panel of the disclosure is a control method for a display panel including a plurality of first self-light-emitting pixels that output first color light and a plurality of second self-light-emitting pixels that output second color light different from the first color light, in which the plurality of first self-light-emitting pixels are arranged, within a predetermined range, corresponding respectively to the second self-light-emitting pixel that corresponds among the plurality of second self-light-emitting pixels, and the control method includes accumulating an influence quantity calculated based on a display amount related each of to the plurality of first self-light-emitting pixels arranged, within the predetermined range, respectively corresponding to the second self-light-emitting pixel, the influence quantity indicating an influence of display of the second self-light-emitting pixel corresponding to the first self-light-emitting pixel, and generating a correction video signal by compensating for an input video signal relative to a temporal change of each of the second self-light-emitting pixels based on the influence quantity related to each of the plurality of second self-light-emitting pixels.

To solve the above problem, a control device of the disclosure is a control device for a display panel including a first self-light-emitting pixel configured to output first color light and a second self-light-emitting pixel configured to output second color light different from the first color light, the control device in which in a first region including a predetermined number of the first self-light-emitting pixels and the second self-light-emitting pixels on the display panel, the first self-light-emitting pixels are displayed with a minimum gray scale value and the second self-light-emitting pixels are displayed with a maximum gray scale value for a predetermined time, in a second region including the predetermined number of the first self-light-emitting pixels and the second self-light-emitting pixels on the display panel, the second region being different from the first region, each of the first self-light-emitting pixels and the second self-light-emitting pixels is displayed with the maximum gray scale value for the predetermined time, and when each of the second self-light-emitting pixels included in the first region and the second self-light-emitting pixels included in the second region is displayed with the maximum gray scale value, a current flowing through the second self-light-emitting pixels included in the second region is made larger than a current flowing through the second self-light-emitting pixels included in the first region.

Advantageous Effects of Disclosure

One aspect of the disclosure can provide a control device for a display panel that can perform correction highly accurately reflecting a level of temporal change (deterioration) due to the influence of an adjacent pixel, and a control method for the display panel.

Figure 2:
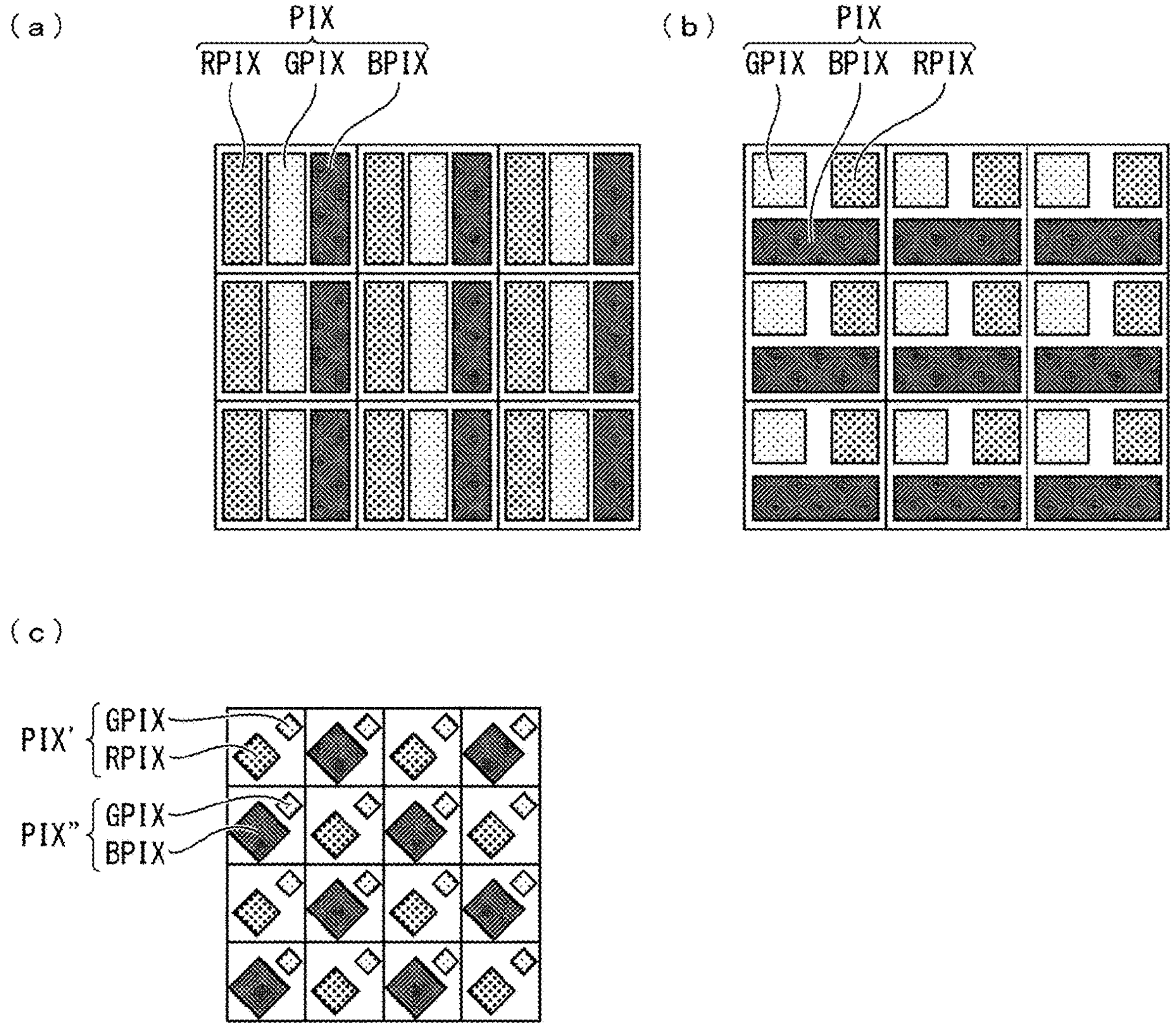

(a), (b), and (c) of FIG. 2 are views illustrating array examples of self-light-emitting pixels in the display panel included in the display device of the first embodiment.

Figure 3:
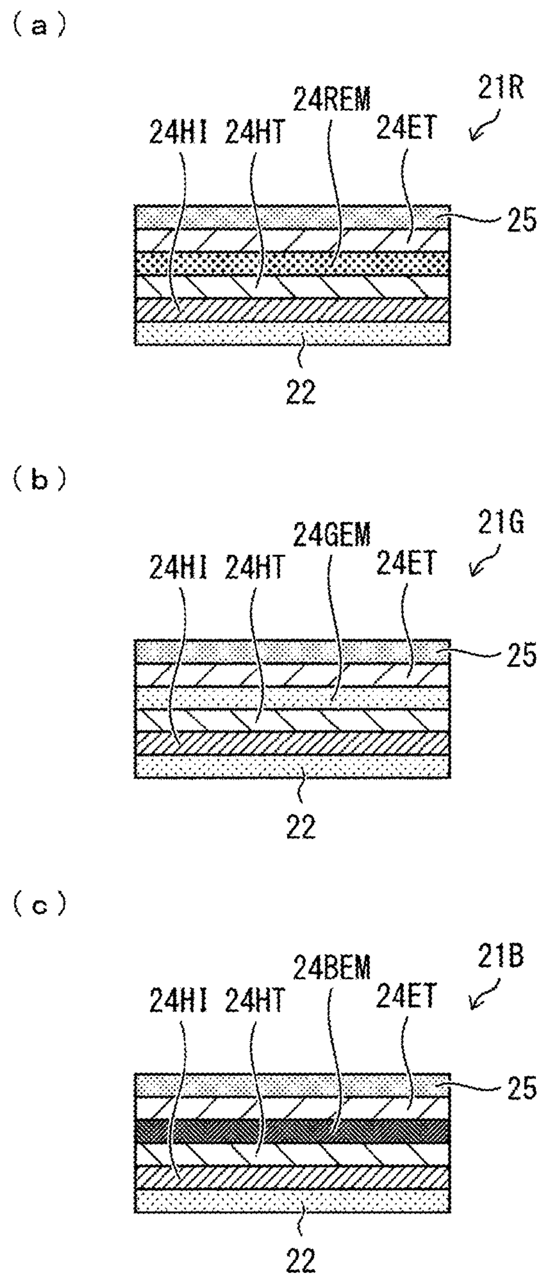

(a) of FIG. 3 is a cross-sectional view illustrating a schematic configuration of a red light-emitting element included in a red self-light-emitting pixel of the display panel included in the display device of the first embodiment, (b) of FIG. 3 is a cross-sectional view illustrating a schematic configuration of a green light-emitting element included in a green self-light-emitting pixel of the display panel included in the display device of the first embodiment, and (c) of FIG. 3 is a cross-sectional view illustrating a schematic configuration of a blue light-emitting element included in a blue self-light-emitting pixel of the display panel included in the display device of the first embodiment.

Figure 4:
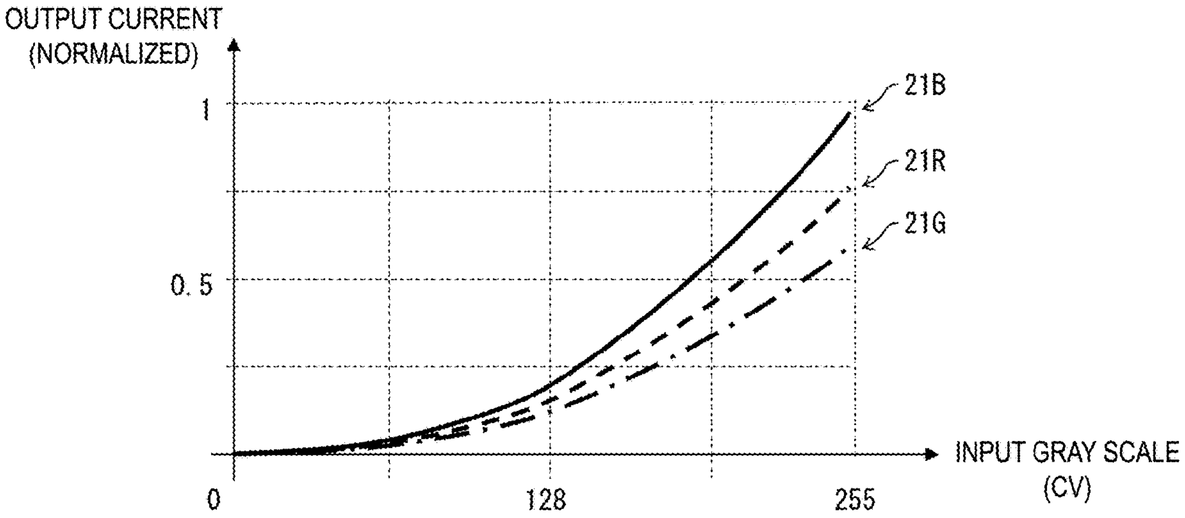

FIG. 4 is a view illustrating a relationship between an input gray scale value and a normalized output current value in each color light-emitting element illustrated in FIG. 3.

Figure 5:
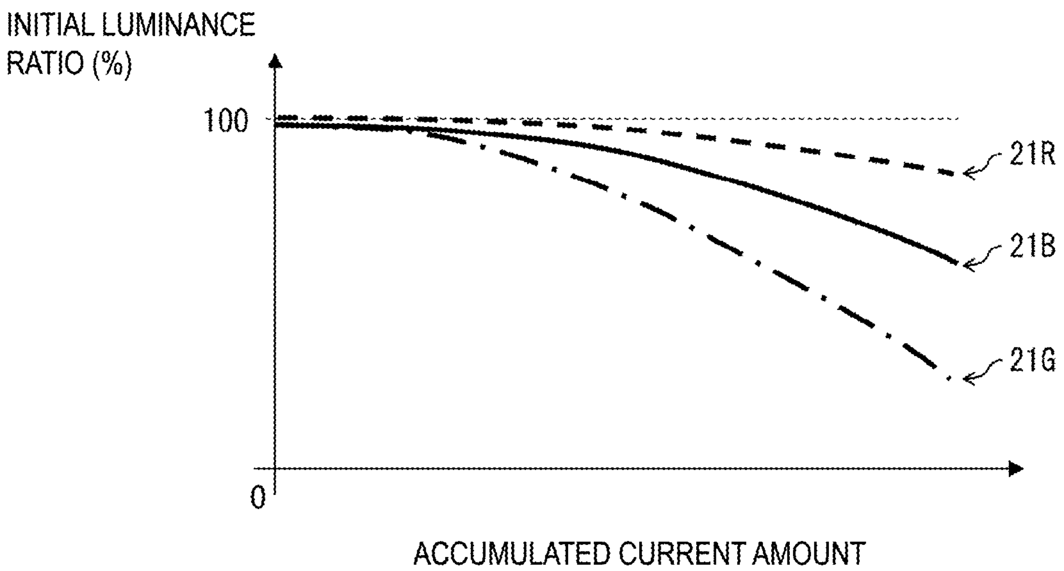

FIG. 5 is a view illustrating a decrease tendency of luminance with an increase in the accumulated current amount of each color light-emitting element illustrated in FIG. 3.

Figure 6:
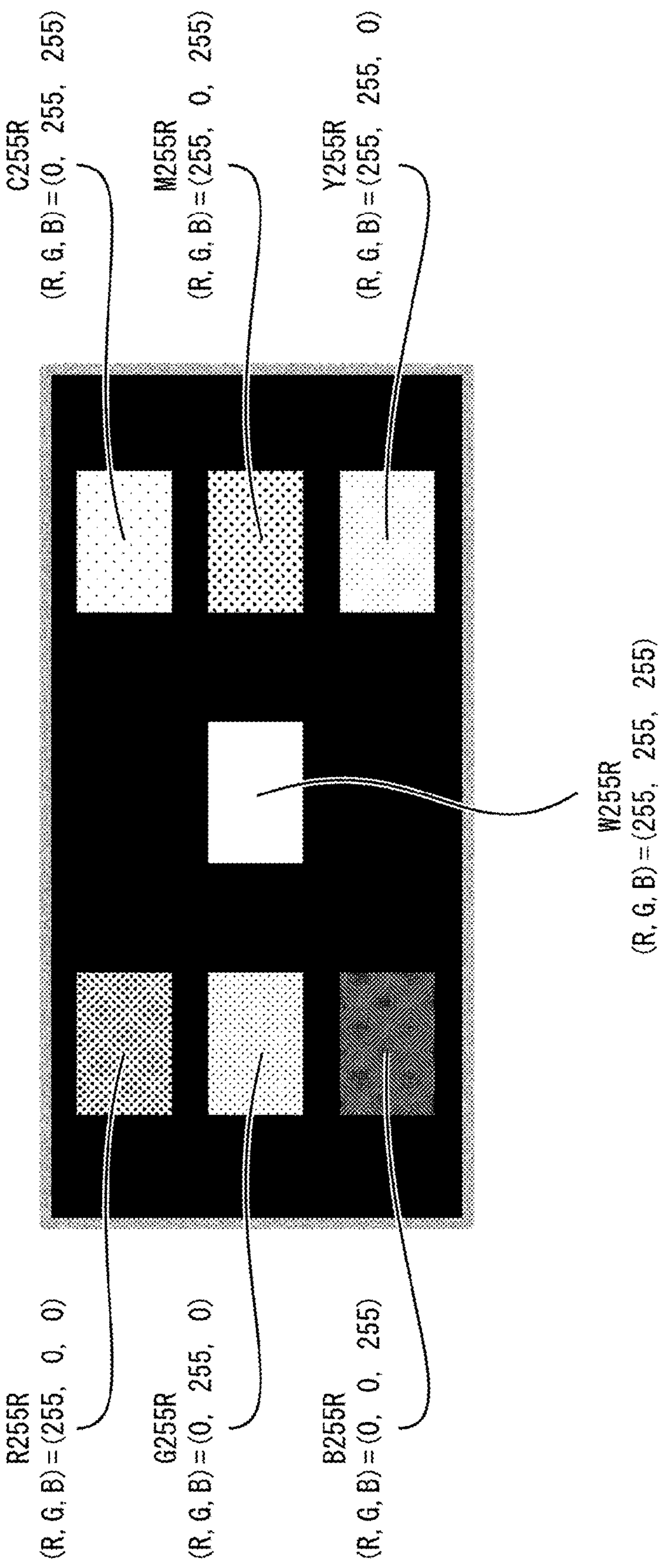

FIG. 6 is a view illustrating an example of a burn-in display pattern.

Figure 7:
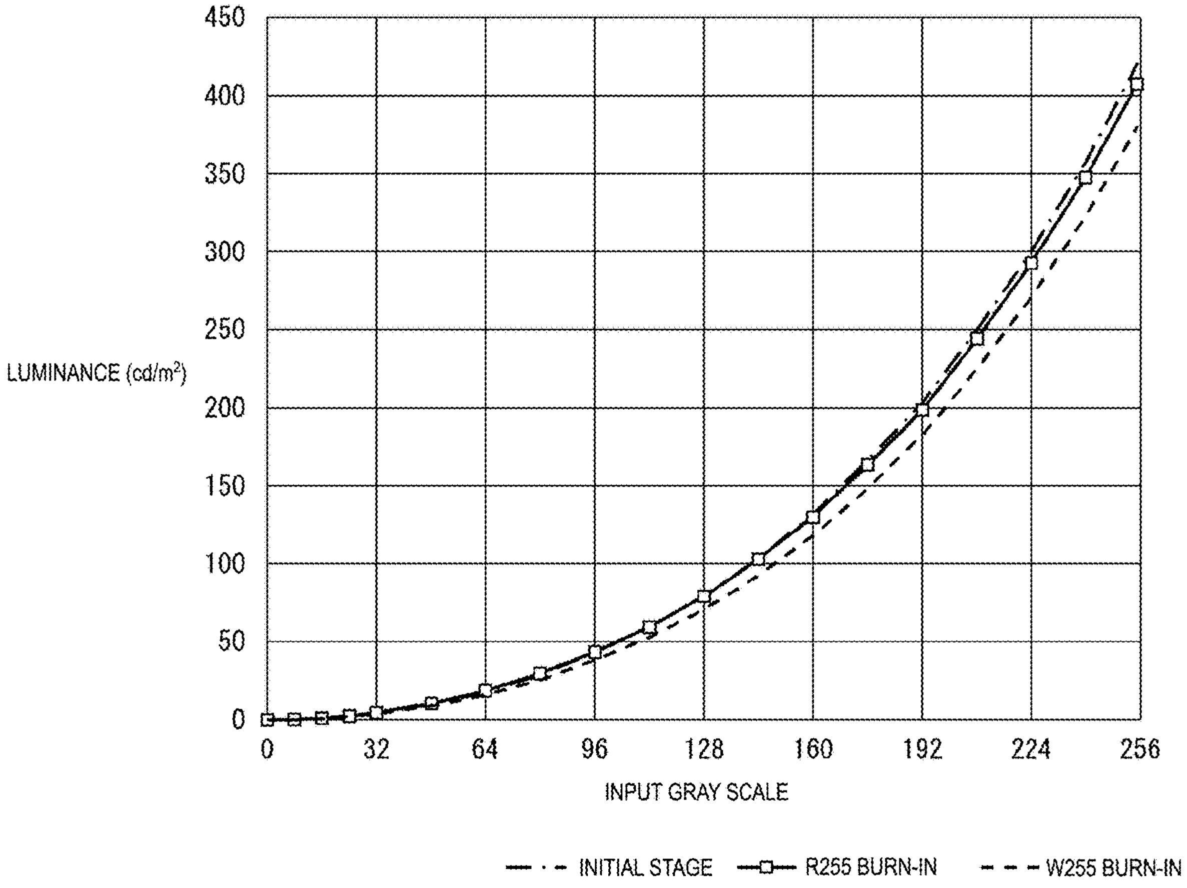

FIG. 7 is a view illustrating a degree of luminance decrease of a red light-emitting element included in a red self-light-emitting pixel of the display panel included in the display device of the first embodiment after an R255 burn-in region illustrated in FIG. 6 is displayed for a predetermined time and a W255 burn-in region illustrated in FIG. 6 is displayed for a predetermined time with respect to initial luminance of the red light-emitting element included in the red self-light-emitting pixel.

Figure 8:
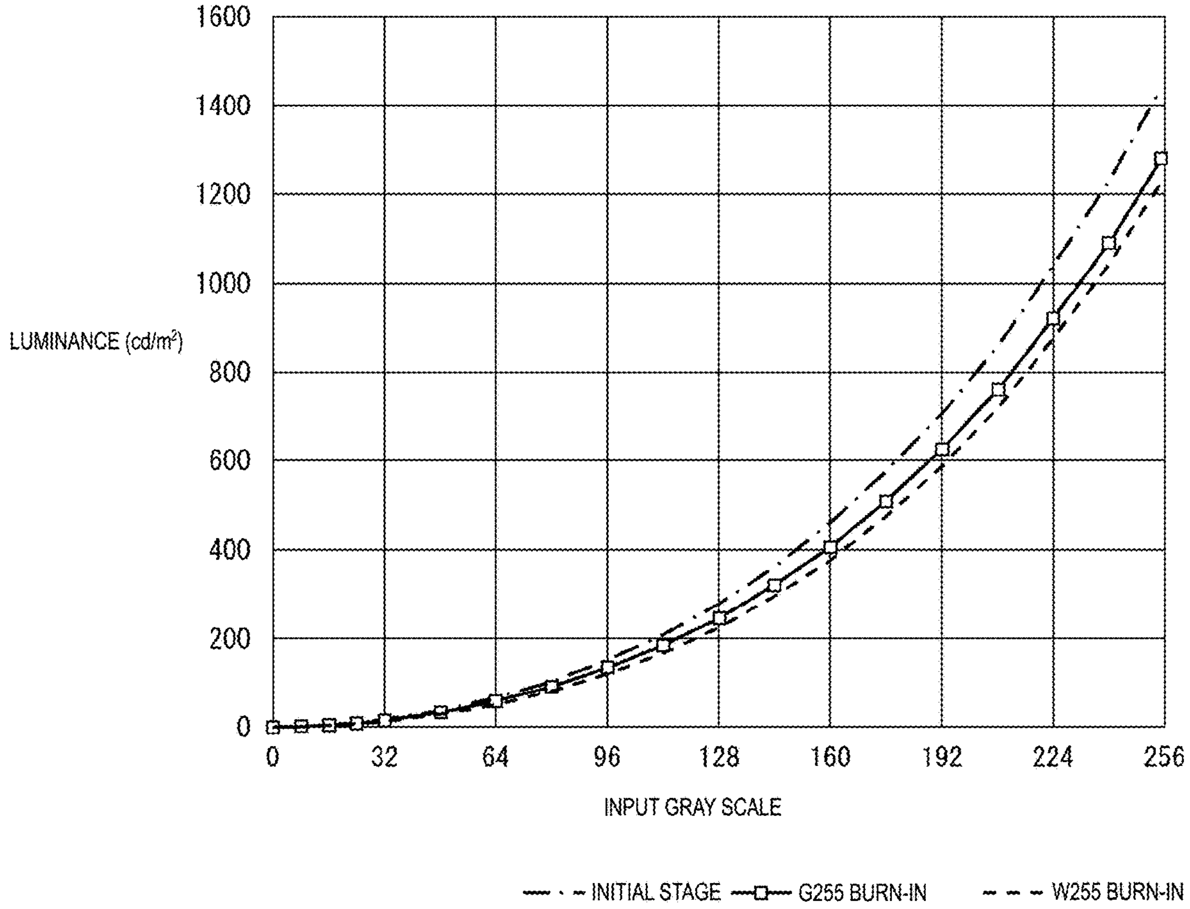

FIG. 8 is a view illustrating a degree of luminance decrease of a green light-emitting element included in a green self-light-emitting pixel of the display panel included in the display device of the first embodiment after a G255 burn-in region illustrated in FIG. 6 is displayed for a predetermined time and a W255 burn-in region illustrated in FIG. 6 is displayed for a predetermined time with respect to initial luminance of the green light-emitting element included in the green self-light-emitting pixel.

Figure 9:
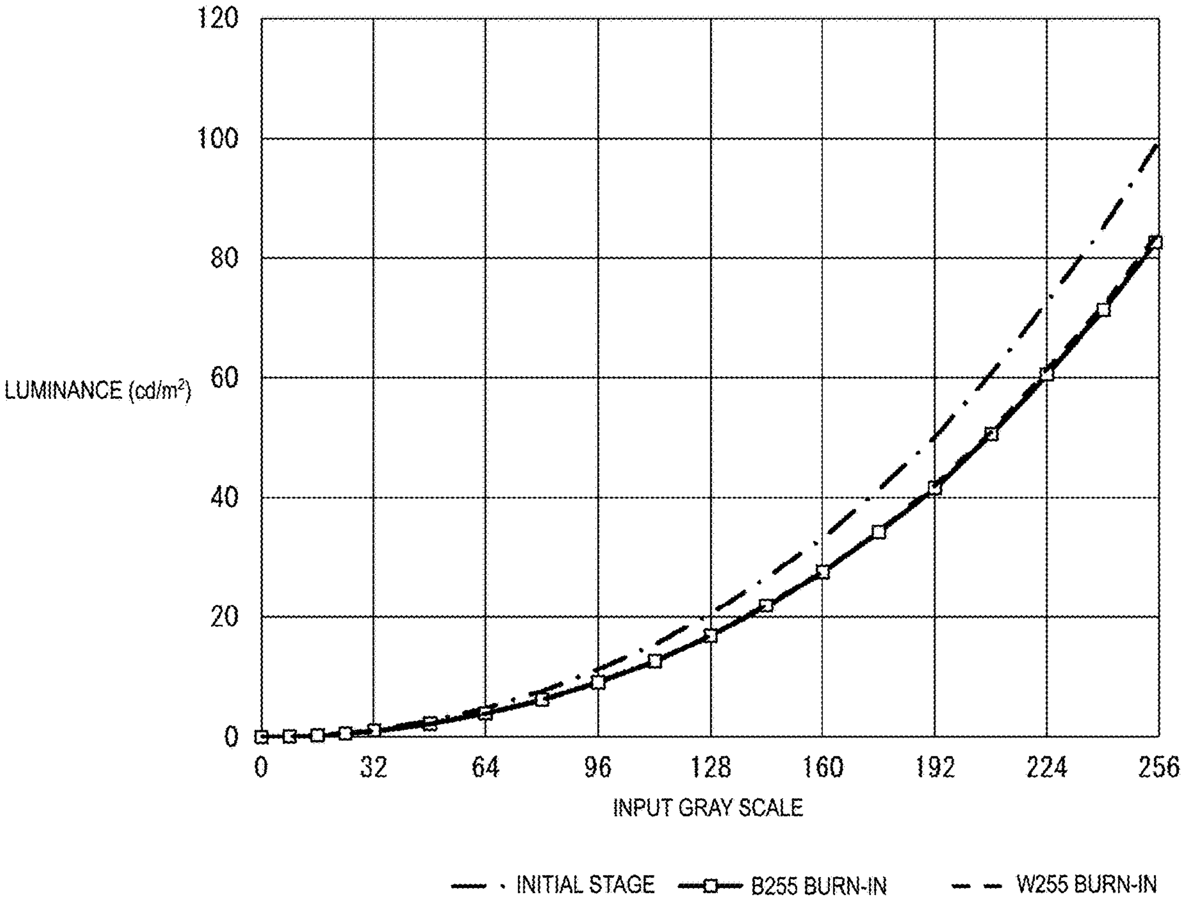

FIG. 9 is a view illustrating a degree of luminance decrease of a blue light-emitting element included in a blue self-light-emitting pixel of the display panel included in the display device of the first embodiment after an B255 burn-in region illustrated in FIG. 6 is displayed for a predetermined time and a W255 burn-in region illustrated in FIG. 6 is displayed for a predetermined time with respect to initial luminance of the blue light-emitting element included in the blue self-light-emitting pixel.

Figure 10:
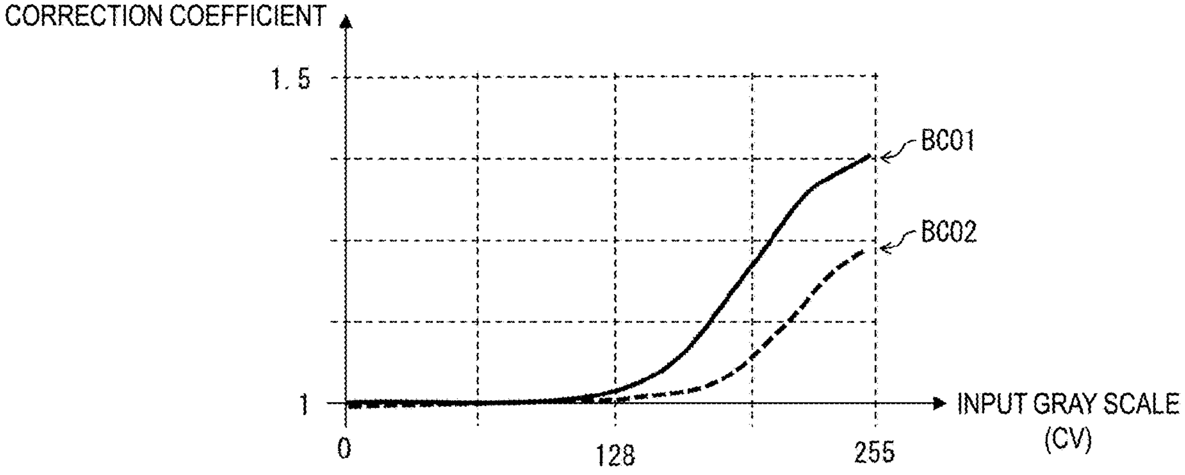

FIG. 10 is a view illustrating an example of a correction coefficient calculated by a correction coefficient calculation unit of an influence quantity data calculation unit included in the display device of the first embodiment.

Figure 11:
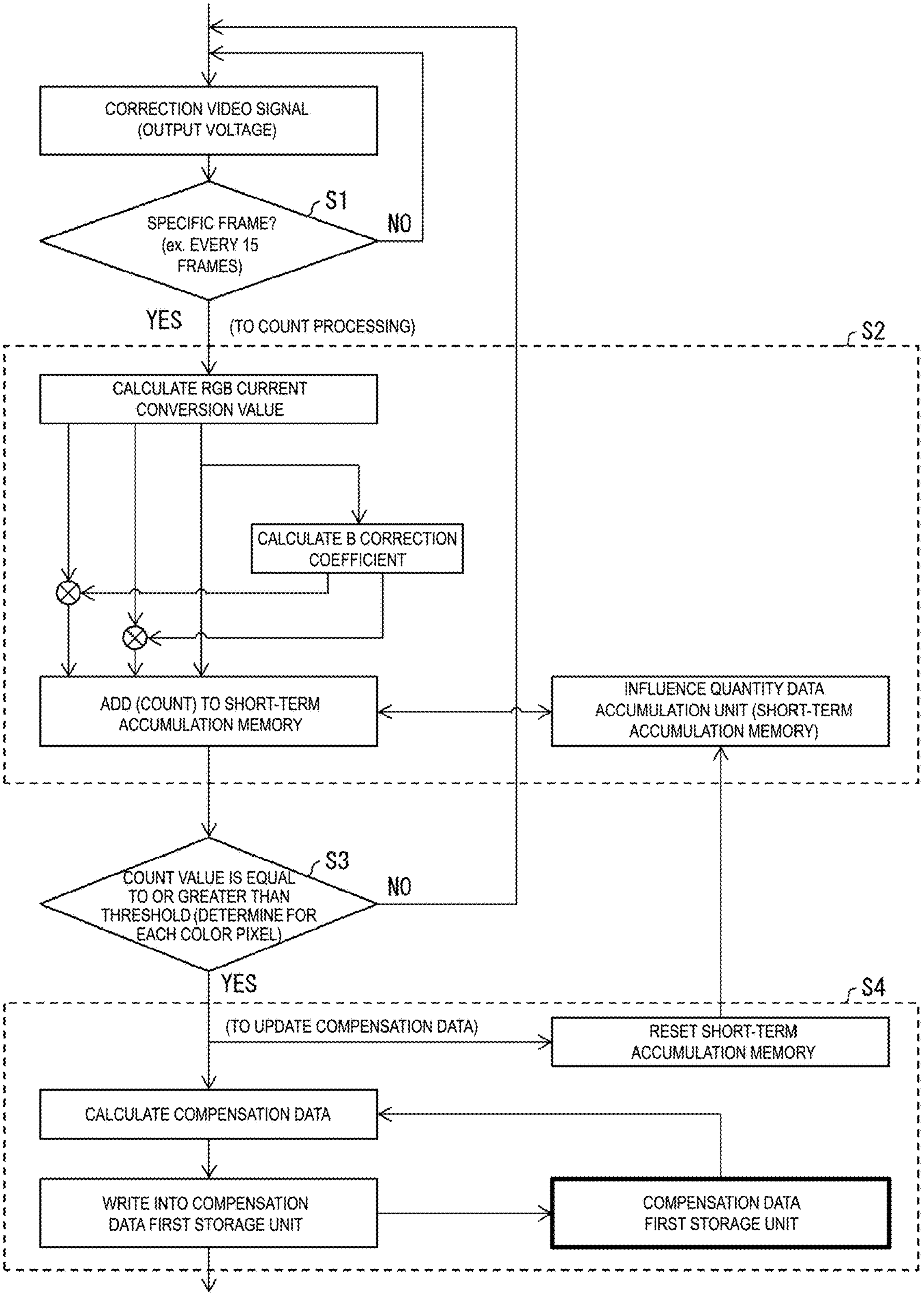

FIG. 11 is a flowchart showing influence quantity data accumulation processing to compensation data update processing performed in the control device included in the display device of the first embodiment.

Figure 12:
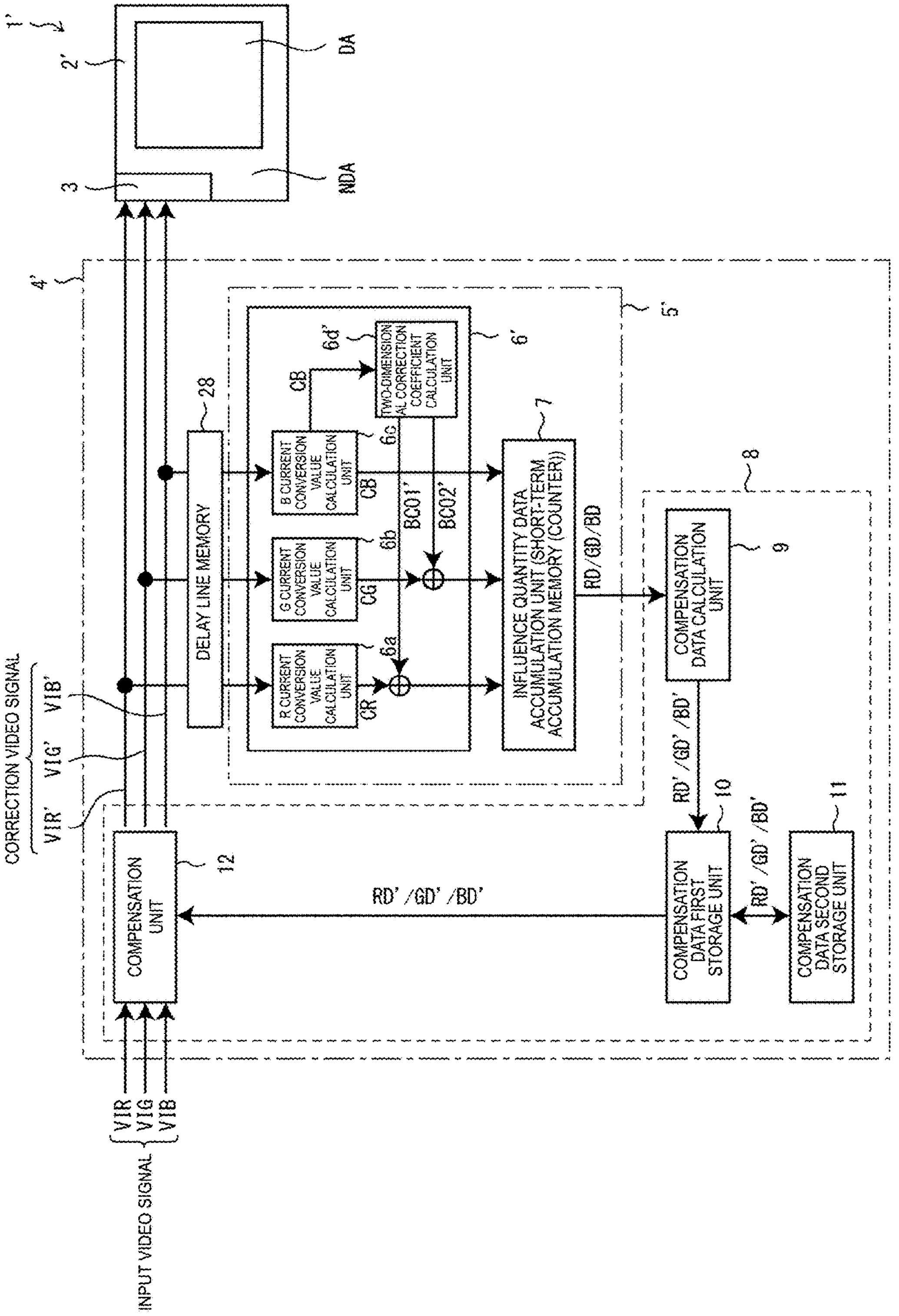

FIG. 12 is a view illustrating a schematic configuration of a display panel included in a display device of a second embodiment and a control device of the display panel.

Figure 13:
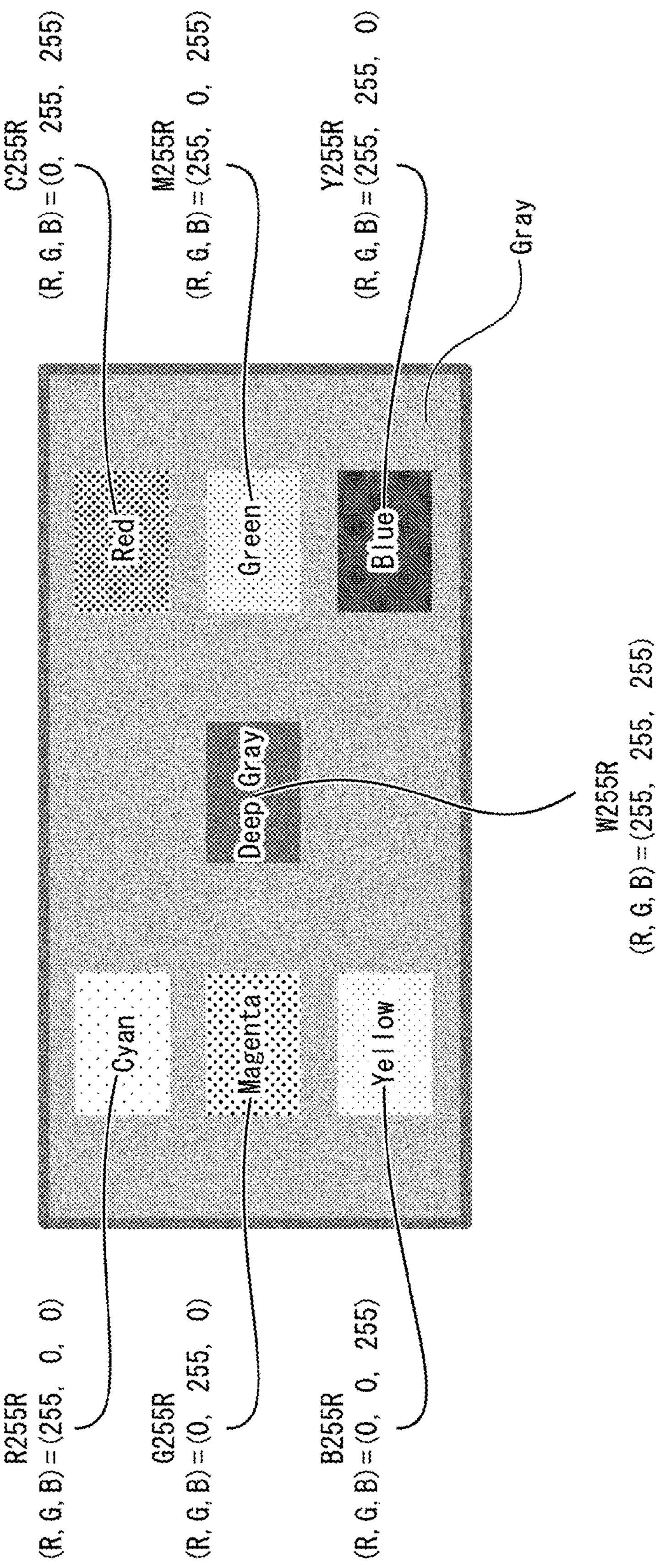

FIG. 13 is a view illustrating an ideally burned in display state in a case where Gray display is performed on the entire surface after the burn-in display pattern illustrated in FIG. 6 is displayed for a predetermined time.

Figure 14:
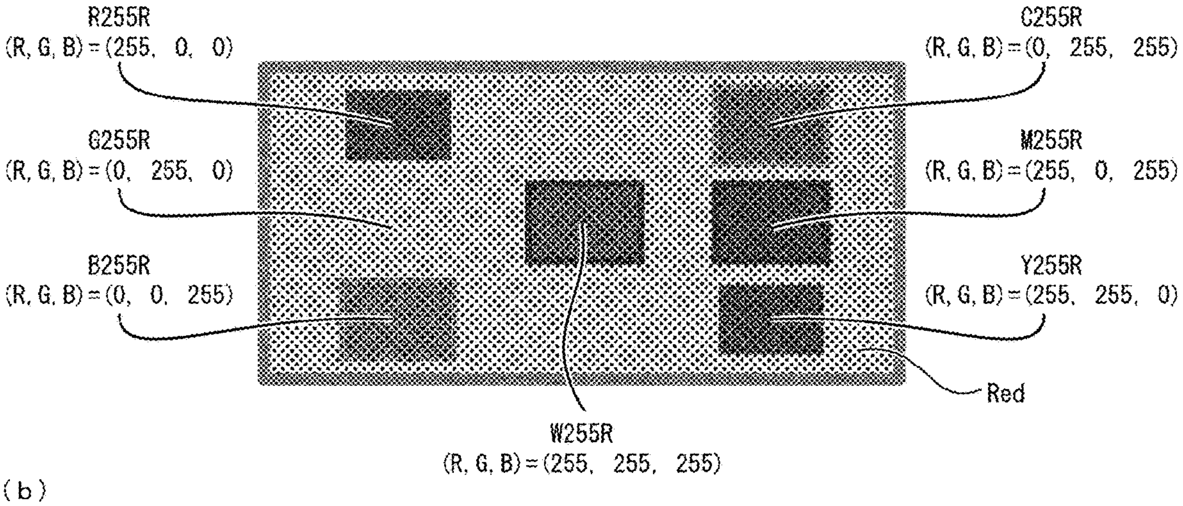
Figure 14:
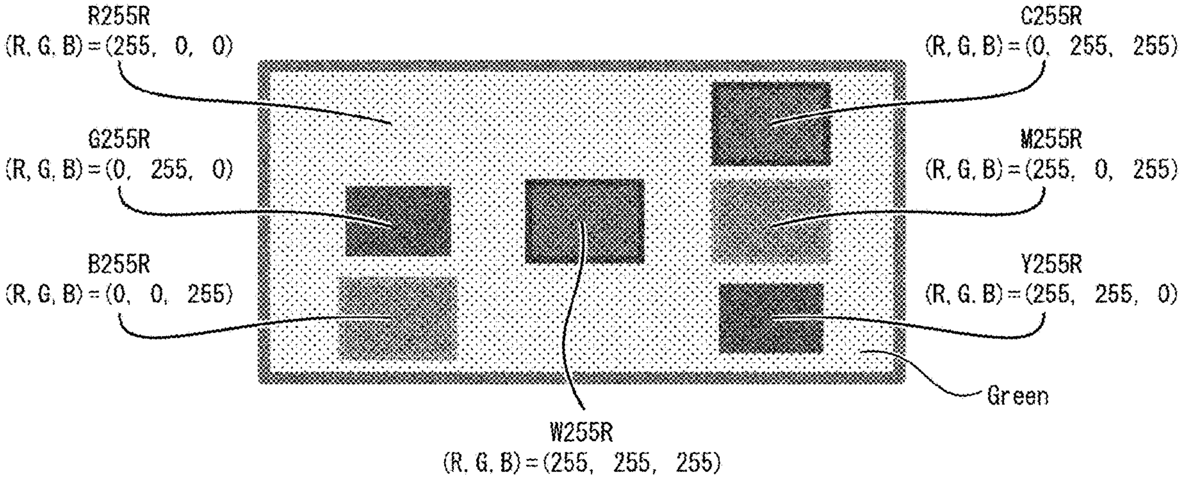
Figure 14:
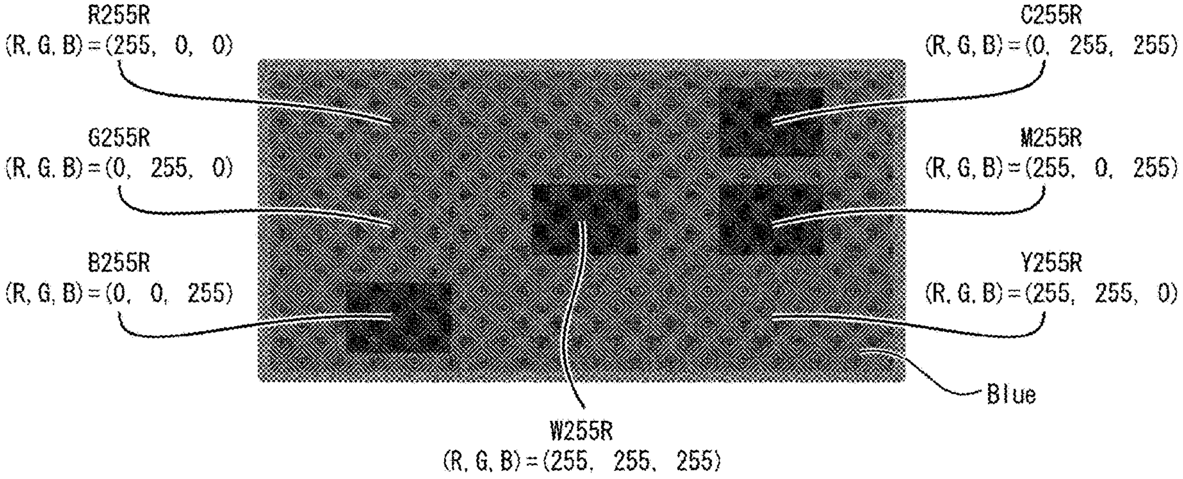

(a) of FIG. 14 is a view illustrating a display state in a case where red monochrome display is performed on the entire surface after the burn-in display pattern illustrated in FIG. 6 is displayed for a predetermined time, (b) of FIG. 14 is a view illustrating a display state in a case where green monochrome display is performed on the entire surface after the burn-in display pattern illustrated in FIG. 6 is displayed for a predetermined time, and (c) of FIG. 14 is a view illustrating a display state in a case where blue monochrome display is performed on the entire surface after the burn-in display pattern illustrated in FIG. 6 is displayed for a predetermined time.

Figure 15:
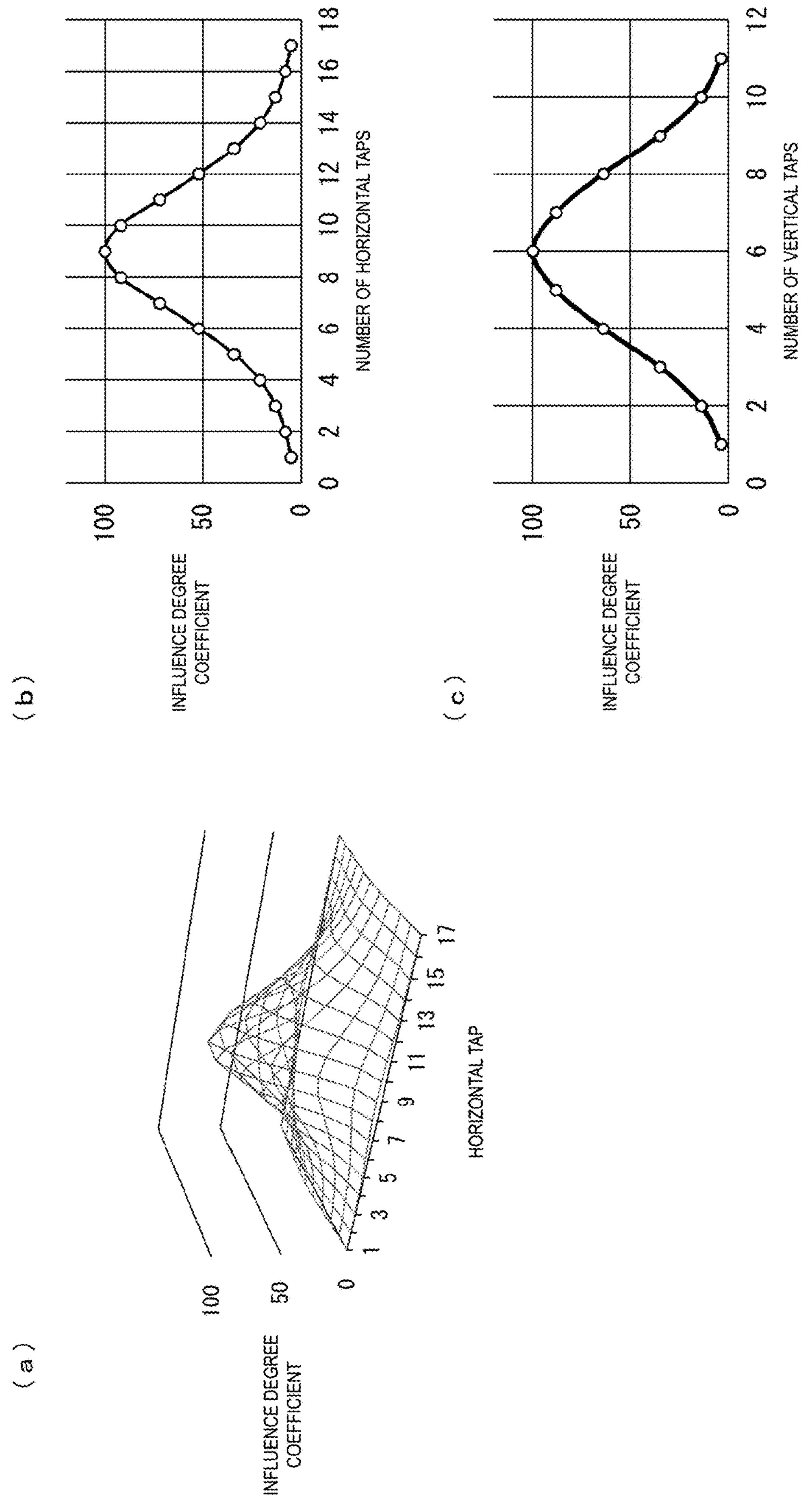

(a) of FIG. 15 is a view illustrating a degree of influence of a specific self-light-emitting pixel on surrounding self-light-emitting pixels in a horizontal direction and a vertical direction, (b) of FIG. 15 is a view illustrating a degree of influence of a specific self-light-emitting pixel on surrounding self-light-emitting pixels in the horizontal direction, and (c) of FIG. 15 is a view illustrating a degree of influence of a specific self-light-emitting pixel on surrounding self-light-emitting pixels in the vertical direction.

Figure 16:
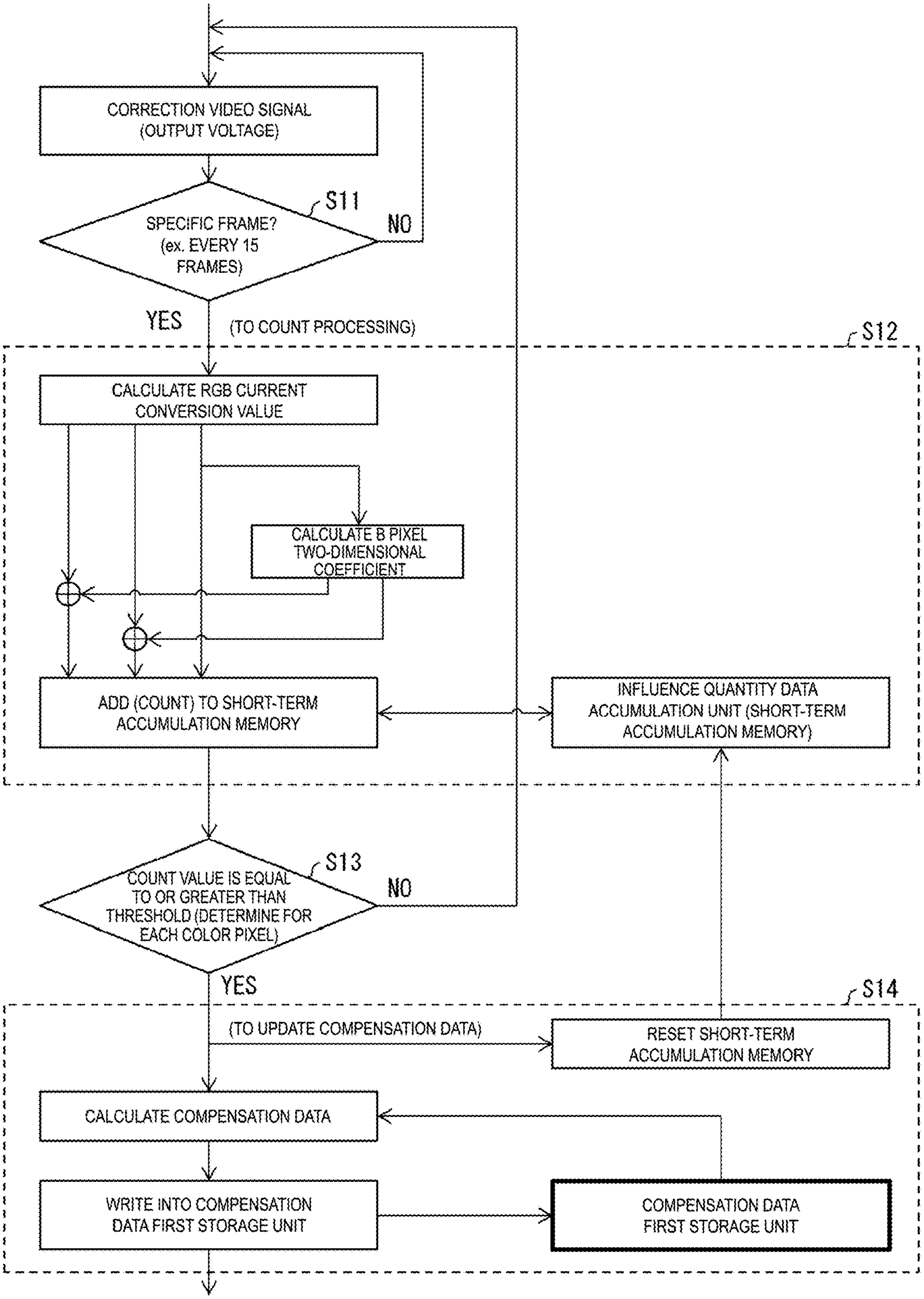

FIG. 16 is a flowchart showing influence quantity data accumulation processing to compensation data update processing performed in the control device included in the display device of the second embodiment.

Figure 17:
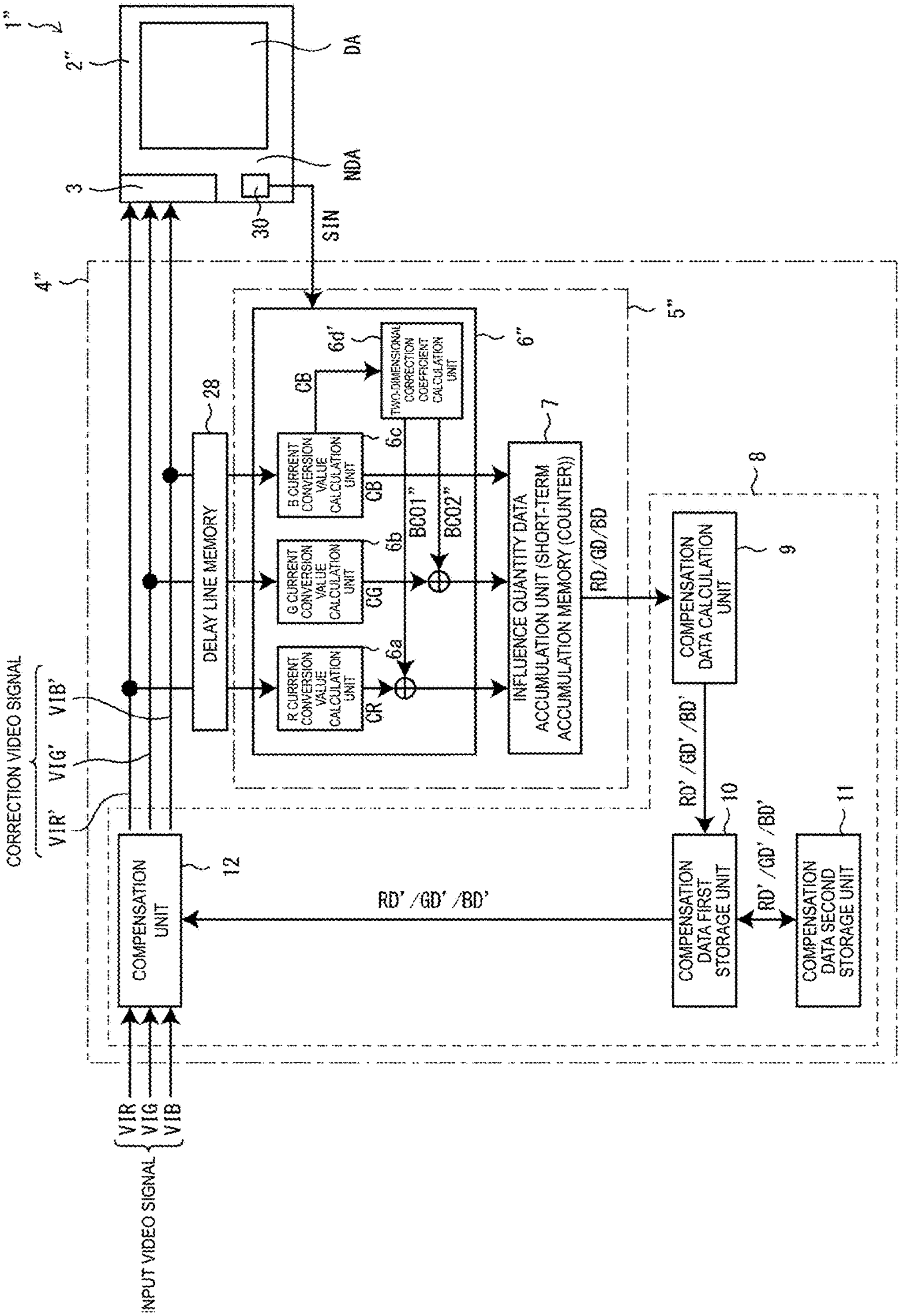

FIG. 17 is a view illustrating a schematic configuration of a display panel included in a display device of a third embodiment and a control device of the display panel.

DESCRIPTION OF EMBODIMENTS

Embodiments of the disclosure will be described with reference to FIGS. 1 to 17 as follows. Hereinafter, for convenience of description, configurations having the same functions as those described in a specific embodiment are denoted by the same reference signs, and descriptions thereof may be omitted.

First Embodiment

Figure 1:
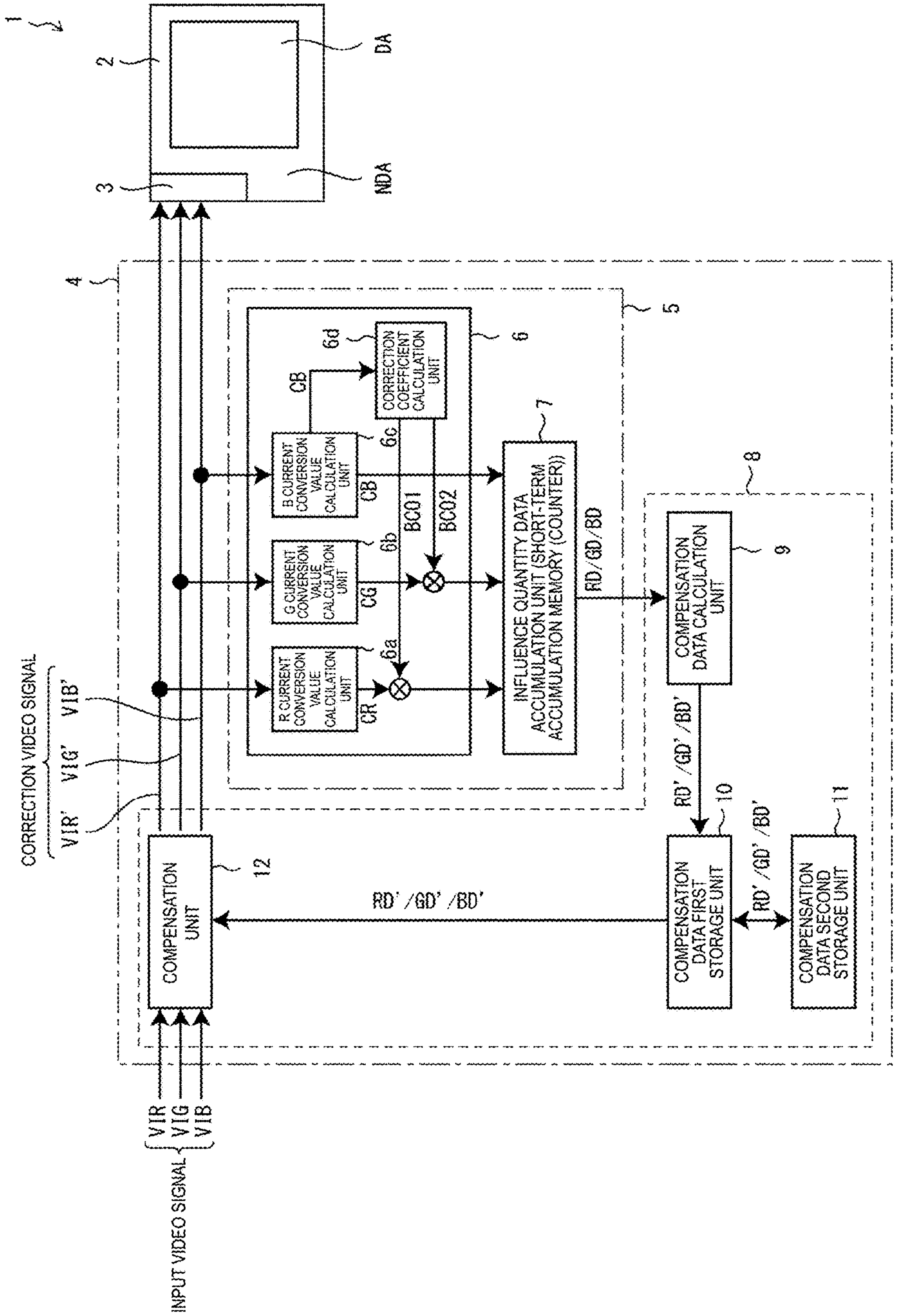
FIG. 1 is a view illustrating a schematic configuration of a display panel included in a display device of a first embodiment and a control device of the display panel.

FIG. 1 is a view illustrating a schematic configuration of a display panel 2 included in a display device 1 of the first embodiment and a control device 4 of the display panel 2.

As illustrated in FIG. 1, display panel 2 includes a frame region NDA and a display region DA. In the present embodiment, a case where the frame region NDA of the display panel 2 is provided with a display control unit 3 will be described as an example, but no such limitation is intended, and the display control unit 3 may be externally attached to the display panel 2, for example. The display control unit 3 generates a scan side control signal, a data side control signal, and write data based on correction video signals VIR', VIG', and VIB', and supplies the scan side control signal to a scan side drive circuit (not illustrated) included in the display panel 2, and supplies the data side control signal and the write data to a data side drive circuit (not illustrated) included in the display panel 2.

(a), (b), and (c) of FIG. 2 are views illustrating array examples of self-light-emitting pixels in the display panel 2 included in the display device 1 of the first embodiment.

In the present embodiment, as illustrated in (a) of FIG. 2, a case where the display region DA of the display panel 2 is provided with a plurality of display units PIX, and each of the plurality of display units PIX includes a red self-light-emitting pixel RPIX, a green self-light-emitting pixel GPIX, and a blue self-light-emitting pixel BPIX having substantially the same shape will be described as an example, but no such limitation is intended. For example, as illustrated in (b) of FIG. 2, the display region DA of the display panel 2 may be provided with the plurality of display units PIX, and each of the plurality of display units PIX may include the blue self-light-emitting pixel BPIX having a longer length in the left-right direction in the figure than that of the red self-light-emitting pixel RPIX and the green self-light-emitting pixel GPIX, and the red self-light-emitting pixel RPIX and the green self-light-emitting pixel GPIX having a shorter length in the left-right direction in the figure than the blue self-light-emitting pixel BPIX. As illustrated in (b) of FIG. 2, a configuration in which one red self-light-emitting pixel RPIX, one green self-light-emitting pixel GPIX, and one blue self-light-emitting pixel BPIX are arrayed is also called an S-stripe array. For example, as illustrated in (c) of FIG. 2, the display region DA of the display panel 2 may be provided with the plurality of display units, a part PIX' of the display units may include the red self-light-emitting pixel RPIX and the green self-light-emitting pixel GPIX, and a remaining part PIX" of the display units may include the green self-light-emitting pixel GPIX and the blue self-light-emitting pixel BPIX. As illustrated in (c) of FIG. 2, a configuration in which one red self-light-emitting pixel RPIX, two green self-light-emitting pixels GPIX, and one blue self-light-emitting pixel BPIX are arrayed is also called a diamond pentile array. Note that the two green self-light-emitting pixels GPIX included in one display unit illustrated in (c) of FIG. 2 can be regarded as one green self-light-emitting pixel because they include one common green light-emitting element.

As illustrated in (a), (b), and (c) of FIG. 2, in the present embodiment, a case where the display unit includes the red self-light-emitting pixel RPIX, the green self-light-emitting pixel GPIX, and the blue self-light-emitting pixel BPIX will be described as an example, but no such limitation is intended. For example, the display unit may further include self-light-emitting pixels of other colors in addition to the red self-light-emitting pixel RPIX, the green self-light-emitting pixel GPIX, and the blue self-light-emitting pixel BPIX.

(a) of FIG. 3 is a cross-sectional view illustrating a schematic configuration of a red light-emitting element 21R included in the red self-light-emitting pixel RPIX of the display panel 2 included in the display device 1 of the first embodiment, (b) of FIG. 3 is a cross-sectional view illustrating a schematic configuration of a green light-emitting element 21G included in the green self-light-emitting pixel GPIX of the display panel 2 included in the display device 1 of the first embodiment, and (c) of FIG. 3 is a cross-sectional view illustrating a schematic configuration of a blue light-emitting element 21B included in the blue self-light-emitting pixel BPIX of the display panel 2 included in the display device 1 of the first embodiment.

In the present embodiment, a case where the display panel 2 included in the display device 1 of the first embodiment includes, as self-light-emitting elements, the red light-emitting element 21R illustrated in (a) of FIG. 3, the green light-emitting element 21G illustrated in (b) of FIG. 3, and the blue light-emitting element 21B illustrated in (c) of FIG. 3, which have a forward layer structure, will be described as an example, but no such limitation is intended, and the red light-emitting element 21R, the green light-emitting element 21G, and the blue light-emitting element 21B may have a rearward layer structure. The red light-emitting element 21R having the forward layer structure illustrated in (a) of FIG. 3 includes a first electrode 22 that is an anode and a second electrode 25 that is a cathode included as an upper layer than the first electrode 22, and between the first electrode 22, which is an anode, and the second electrode 25, which is a cathode, a hole injection layer 24HI, a hole transport layer 24HT, a red light-emitting layer 24REM, and an electron transport layer 24ET can be layered in order from the first electrode 22 side, for example. An electron injection layer (not illustrated) may be further included between the electron transport layer 24ET and the second electrode 25. One or more layers of the hole injection layer 24HI, the hole transport layer 24HT, the electron transport layer 24ET, and the electron injection layer (not illustrated) other than the red light-emitting layer 24REM may be appropriately omitted. The green light-emitting element 21G having the forward layer structure illustrated in (a) of FIG. 3 includes a first electrode 22 that is an anode and a second electrode 25 that is a cathode included as an upper layer than the first electrode 22, and between the first electrode 22, which is an anode, and the second electrode 25, which is a cathode, a hole injection layer 24HI, a hole transport layer 24HT, a green light-emitting layer 24GEM, and an electron transport layer 24ET can be layered in order from the first electrode 22 side, for example. An electron injection layer (not illustrated) may be further included between the electron transport layer 24ET and the second electrode 25. One or more layers of the hole injection layer 24HI, the hole transport layer 24HT, the electron transport layer 24ET, and the electron injection layer (not illustrated) other than the green light-emitting layer 24GEM may be appropriately omitted. A blue light-emitting element 21B having the forward layer structure illustrated in (a) of FIG. 3 includes a first electrode 22 that is an anode and a second electrode 25 that is a cathode included as an upper layer than the first electrode 22, and between the first electrode 22, which is an anode, and the second electrode 25, which is a cathode, a hole injection layer 24HI, a hole transport layer 24HT, a blue light-emitting layer 24BEM, and an electron transport layer 24ET can be layered in order from the first electrode 22 side, for example. An electron injection layer (not illustrated) may be further included between the electron transport layer 24ET and the second electrode 25. One or more layers of the hole injection layer 24HI, the hole transport layer 24HT, the electron transport layer 24ET, and the electron injection layer (not illustrated) other than the blue light-emitting layer 24BEM may be appropriately omitted.

Although not illustrated, each color light-emitting element having a rearward layer structure includes a first electrode that is a cathode and a second electrode that is an anode included as an upper layer than the first electrode, and between the first electrode, which is a cathode, and the second electrode, which is an anode, an electron injection layer, an electron transport layer, a corresponding light-emitting layer, a hole transport layer, and a hole injection layer can be layered in order from the first electrode side, for example. One or more layers of the electron injection layer, the electron transport layer, the hole transport layer, and the hole injection layer other than the corresponding light-emitting layer may be appropriately omitted.

In the present embodiment, a case where the red light-emitting element 21R, the green light-emitting element 21G, and the blue light-emitting element 21B are quantum dot light-emitting diodes (QLED) will be described as an example, but no such limitation is intended, and the red light-emitting element 21R, the green light-emitting element 21G, and the blue light-emitting element 21B may be organic light-emitting diodes (OLED), and furthermore, some of the red light-emitting elements 21R, the green light-emitting elements 21G, and the blue light-emitting elements 21B may be QLEDs, and the remaining parts of the red light-emitting elements 21R, the green light-emitting elements 21G, and the blue light-emitting elements 21B may be OLEDs.

The red light-emitting element 21R, the green light-emitting element 21G, and the blue light-emitting element 21B illustrated in (a), (b), and (c) of FIG. 3 may be of a top emitting type or a bottom emitting type. Since the red light-emitting element 21R, the green light-emitting element 21G, and the blue light-emitting element 21B have a forward layer structure in which the second electrode 25, which is a cathode, is arranged as an upper layer than the first electrode 22, which is an anode, in order to provide the top emitting type, the first electrode 22, which is an anode, may be formed of an electrode material that reflects visible light, and the second electrode 25, which is a cathode, may be formed of an electrode material that transmits visible light, and in order to provide the bottom emitting type, the first electrode 22, which is an anode, may be formed of an electrode material that transmits visible light, and the second electrode 25, which is a cathode, may be formed of an electrode material that reflects visible light. On the other hand, when the red light-emitting element, the green light-emitting element, and the blue light-emitting element have a rearward layer structure in which the second electrode, which is an anode, is arranged as an upper layer than the first electrode, which is a cathode, in order to provide the top emitting type, the first electrode, which is a cathode, may be formed of an electrode material that reflects visible light, and the second electrode, which is an anode, may be formed of an electrode material that transmits visible light, and in order to provide the bottom emitting type, the first electrode, which is a cathode, may be formed of an electrode material that transmits visible light, and the second electrode, which is an anode, may be formed of an electrode material that reflects visible light.

The electrode material that reflects visible light is not particularly limited as long as the material can reflect visible light and has electrical conductivity. Examples include metal materials such as Al, Mg, Li, and Ag, alloys of the metal materials, a layered body of the metal materials and transparent metal oxides (e.g., indium tin oxide, indium zinc oxide, indium gallium zinc oxide, and the like), or a layered body of the alloys and the transparent metal oxides.

On the other hand, the electrode material that transmits visible light is not particularly limited as long as the material can transmit visible light and has electrical conductivity. Examples include a thin film formed of a transparent metal oxide (e.g., indium tin oxide, indium zinc oxide, indium gallium zinc oxide, and the like) or a metal material such as Al and Ag, or a nano wire formed of a metal material such as Al and Ag.

FIG. 4 is a view illustrating a relationship between an input gray scale value (CV) and a normalized output current value in each of the red light-emitting element 21R illustrated in (a) of FIG. 3, the green light-emitting element 21G illustrated in (b) of FIG. 3, and the blue light-emitting element 21B illustrated in (c) of FIG. 3.

As illustrated in FIG. 4, red light-emitting element 21R, green light-emitting element 21G, and blue light-emitting element 21B have different curves showing a relationship of normalized output current values corresponding to respective input gray scale values (CV) from 0 gray scales to 255 gray scales, and thus have different element characteristics.

FIG. 5 is a view illustrating a decrease tendency of the luminance with an increase in the accumulated current amount in each of the red light-emitting element 21R illustrated in (a) of FIG. 3, the green light-emitting element 21G illustrated in (b) of FIG. 3, and the blue light-emitting element 21B illustrated in (c) of FIG. 3.

In the present embodiment, a case where the accumulated current amount of the red light-emitting element 21R is an influence quantity indicating the influence of display of the red self-light-emitting pixel RPIX including the red light-emitting element 21R, and is a value calculated based on the display amount related to the blue self-light-emitting pixel BPIX including the blue light-emitting element 21B arranged within the same display unit range and the display amount related to the red self-light-emitting pixel RPIX itself including the red light-emitting element 21R arranged within the same display unit range will be described as an example, but no such limitation is intended. For example, the influence quantity indicating the influence of display of the red self-light-emitting pixel RPIX including the red light-emitting element 21R may be a value calculated based on the display amount related to the blue self-light-emitting pixel BPIX including the blue light-emitting element 21B arranged within the same display unit range, the display amount related to the green self-light-emitting pixel GPIX including the green light-emitting element 21G arranged within the same display unit range, and the display amount related to the red self-light-emitting pixel RPIX itself including the red light-emitting element 21R arranged within the same display unit range.

In the present embodiment, a case where the accumulated current amount of the green light-emitting element 21G is an influence quantity indicating the influence of display of the green self-light-emitting pixel GPIX including the green light-emitting element 21G, and is a value calculated based on the display amount related to the blue self-light-emitting pixel BPIX including the blue light-emitting element 21B arranged within the same display unit range and the display amount related to the green self-light-emitting pixel GPIX itself including the green light-emitting element 21G arranged within the same display unit range will be described as an example, but no such limitation is intended. For example, the influence quantity indicating the influence of display of the green self-light-emitting pixel GPIX including the green light-emitting element 21G may be a value calculated based on the display amount related to the blue self-light-emitting pixel BPIX including the blue light-emitting element 21B arranged within the same display unit range, the display amount related to the red self-light-emitting pixel RPIX including the red light-emitting element 21R arranged within the same display unit range, and the display amount related to the green self-light-emitting pixel GPIX itself including the green light-emitting element 21G arranged within the same display unit range.

In the present embodiment, a case where the accumulated current amount of the blue light-emitting element 21B is an influence quantity indicating the influence of display of the blue self-light-emitting pixel BPIX including the blue light-emitting element 21B, and is a value calculated based on the display amount related to the blue self-light-emitting pixel BPIX itself including the blue light-emitting element 21B will be described as an example, but no such limitation is intended. For example, the influence quantity indicating the influence of display of the blue self-light-emitting pixel BPIX including the blue light-emitting element 21B may be a value calculated based on the display amount related to the blue self-light-emitting pixel BPIX itself including the blue light-emitting element 21B arranged within the same display unit range, the display amount related to the red self-light-emitting pixel RPIX including the red light-emitting element 21R arranged within the same display unit range, and the display amount related to the green self-light-emitting pixel GPIX including the green light-emitting element 21G arranged within the same display unit range.

Note that the influence quantity indicating the influence of display of each color self-light-emitting pixel is a degree of a luminance decrease of each color light-emitting element that can be judged from the accumulated current amount if the relationship between the accumulated current amount and the luminance decrease according to the element characteristics of the red light-emitting element 21R, the green light-emitting element 21G, and the blue light-emitting element 21B as illustrated in FIG. 5, for example, is acquired in advance.

In the present embodiment, a case where the display amount related to each color self-light-emitting pixel itself is a normalized output current value corresponding to each input gray scale value (CV) illustrated in FIG. 4 will be described as an example, but no such limitation is intended, and the display amount may be the input gray scale value (CV).

In the present embodiment, a case where the display amount related to the blue self-light-emitting pixel BPIX is a correction coefficient described later calculated based on a normalized output current value corresponding to each input gray scale value (CV) illustrated in FIG. 4 will be described as an example, but no such limitation is intended.

In the present embodiment, a case where each of the influence quantity indicating the influence of display of the red self-light-emitting pixel RPIX and the influence quantity indicating the influence of display of the green self-light-emitting pixel GPIX is calculated by reflecting the display amount of the blue self-light-emitting pixel BPIX including the blue light-emitting element 21B arranged within the same display unit range has been described as an example, but no such limitation is intended, and each of the influence quantity indicating the influence of display of the red self-light-emitting pixel RPIX and the influence quantity indicating the influence of display of the green self-light-emitting pixel GPIX may be calculated by reflecting the display amount of the blue self-light-emitting pixel BPIX including the blue light-emitting element 21B arranged within a plurality of adjacent display unit ranges as in the second embodiment described later.

FIG. 6 is a view illustrating an example of a burn-in display pattern.

As illustrated in FIG. 6, the inventors of the disclosure have conducted an aging test (burn-in test) by displaying, in the display region DA of the display panel 2, an R255 burn-in region R255R in which display is performed with the gray scale of each color self-light-emitting pixel of one display unit being (R, G, B)=(255, 0, 0), a G255 burn-in region G255R in which display is performed with the gray scale of each color self-light-emitting pixel of one display unit being (R, G, B)=(0, 255, 0), a B255 burn-in region B255R in which display is performed with the gray scale of each color self-light-emitting pixel of one display unit being (R, G, B)=(0, 0, 255), a W255 burn-in region W255R in which display is performed with the gray scale of each color self-light-emitting pixel of one display unit being (R, G, B)=(255, 255, 255), a C255 burn-in region C255R in which display is performed with the gray scale of each color self-light-emitting pixel of one display unit being (R, G, B)=(0, 255, 255), an M255 burn-in region M255R in which display is performed with the gray scale of each color self-light-emitting pixel of one display unit being (R, G, B)=(255, 0, 255), and a Y255 burn-in region Y255R in which display is performed with the gray scale of each color self-light-emitting pixel of one display unit being (R, G, B)=(255, 255, 0).

Each of the burn-in regions R255R, G255R, B255R, W255R, C255R, M255R, and Y255R can be set to a size including 10,000 self-light-emitting pixels, for example, but is not limited to this, and the size of each burn-in region can be appropriately set.

The time for displaying each of the burn-in regions R255R, G255R, B255R, W255R, C255R, M255R, and Y255R can be set to, for example, 100 hours, but is not limited to this, and the time for displaying each of the burn-in regions can be appropriately set.

When the inventors of the disclosure conducted the aging (burn-in) test by performing the display as illustrated in FIG. 6 on the display region DA of the display panel 2, only the red light-emitting element 21R included in the red self-light-emitting pixel RPIX deteriorated and luminance decrease occurred in the R255 burn-in region R255R, and the green light-emitting element 21G included in the green self-light-emitting pixel GPIX and the blue light-emitting element 21B included in the blue self-light-emitting pixel BPIX did not deteriorate. On the other hand, in the W255 burn-in region W255R, although the degree of deterioration is different, the red light-emitting element 21R included in the red self-light-emitting pixel RPIX, the green light-emitting element 21G included in the green self-light-emitting pixel GPIX, and the blue light-emitting element 21B included in the blue self-light-emitting pixel BPIX deteriorated and luminance decrease occurred. At this time, it is ideal that the decrease amount of the luminance of the red light-emitting element 21R included in the red self-light-emitting pixel RPIX in the R255 burn-in region R255R and the decrease amount of the luminance of the red light-emitting element 21R included in the red self-light-emitting pixel RPIX of the W255 burn-in region W255R are equal to each other, but a symptom that they are not equal to each other occurred in the actual display panel 2.

FIG. 7 is a view illustrating the degree of decrease in the luminance of the red light-emitting element 21R included in the red self-light-emitting pixel RPIX of the display panel 2 included in the display device 1 of the first embodiment after the R255 burn-in region R255R illustrated in FIG. 6 is displayed for a predetermined time (e.g., 100 hours), then the W255 burn-in region W255R illustrated in FIG. 6 is displayed for a predetermined time (e.g., 100 hours) with respect to the initial luminance of the red light-emitting element 21R included in the red self-light-emitting pixel RPIX.

As illustrated in FIG. 7, with respect to the initial luminance of the red light-emitting element 21R included in the red self-light-emitting pixel RPIX of the display panel 2, the decrease amount of the luminance of the red light-emitting element 21R included in the red self-light-emitting pixel RPIX of the R255 burn-in region R255R is not large, but the decrease amount of the luminance of the red light-emitting element 21R included in the red self-light-emitting pixel RPIX of the W255 burn-in region W255R is large.

When the inventors of the disclosure conducted the aging (burn-in) test by performing the display as illustrated in FIG. 6 on the display region DA of the display panel 2, only the green light-emitting element 21G included in the green self-light-emitting pixel GPIX deteriorated and luminance decrease occurred in the G255 burn-in region G255R, and the red light-emitting element 21R included in the red self-light-emitting pixel RPIX and the blue light-emitting element 21B included in the blue self-light-emitting pixel BPIX did not deteriorate. On the other hand, in the W255 burn-in region W255R, although the degree of deterioration is different, the red light-emitting element 21R included in the red self-light-emitting pixel RPIX, the green light-emitting element 21G included in the green self-light-emitting pixel GPIX, and the blue light-emitting element 21B included in the blue self-light-emitting pixel BPIX deteriorated and luminance decrease occurred. At this time, it is ideal that the decrease amount of the luminance of the green light-emitting element 21G included in the green self-light-emitting pixel GPIX in the G255 burn-in region G255R and the decrease amount of the luminance of the green light-emitting element 21G included in the green self-light-emitting pixel GPIX of the W255 burn-in region W255R are equal to each other, but a symptom that they are not equal to each other occurred in the actual display panel 2.

FIG. 8 is a view illustrating the degree of decrease in the luminance of the green light-emitting element 21G included in the green self-light-emitting pixel GPIX of the display panel 2 included in the display device 1 of the first embodiment after the G255 burn-in region G255R illustrated in FIG. 6 is displayed for a predetermined time (e.g., 100 hours), then the W255 burn-in region W255R illustrated in FIG. 6 is displayed for a predetermined time (e.g., 100 hours) with respect to the initial luminance of the green light-emitting element 21G included in the green self-light-emitting pixel GPIX.

As illustrated in FIG. 8, with respect to the initial luminance of the green light-emitting element 21G included in the green self-light-emitting pixel GPIX of the display panel 2, both the decrease amount of the luminance of the green light-emitting element 21G included in the green self-light-emitting pixel GPIX of the G255 burn-in region G255R and the decrease amount of the luminance of the green light-emitting element 21G included in the green self-light-emitting pixel GPIX of the W255 burn-in region W255R are large, but the decrease amount of the luminance of the green light-emitting element 21G included in the green self-light-emitting pixel GPIX of the W255 burn-in region W255R is slightly larger.

When the inventors of the disclosure conducted the aging (burn-in) test by performing the display as illustrated in FIG. 6 on the display region DA of the display panel 2, only the blue light-emitting element 21B included in the blue self-light-emitting pixel BPIX deteriorated and luminance decrease occurred in the B255 burn-in region B255R, and the red light-emitting element 21R included in the red self-light-emitting pixel RPIX and the green light-emitting element 21G included in the green self-light-emitting pixel GPIX did not deteriorate. On the other hand, in the W255 burn-in region W255R, although the degree of deterioration is different, the red light-emitting element 21R included in the red self-light-emitting pixel RPIX, the green light-emitting element 21G included in the green self-light-emitting pixel GPIX, and the blue light-emitting element 21B included in the blue self-light-emitting pixel BPIX deteriorated and luminance decrease occurred. At this time, the decrease amount of the luminance of the blue light-emitting element 21B included in the blue self-light-emitting pixel BPIX in the B255 burn-in region B255R and the decrease amount of the luminance of the blue light-emitting element 21B included in the blue self-light-emitting pixel BPIX of the W255 burn-in region W255R are equal to each other, which can be said to be an ideal state.

FIG. 9 is a view illustrating the degree of decrease in the luminance of the blue light-emitting element 21B included in the blue self-light-emitting pixel BPIX of the display panel 2 included in the display device 1 of the first embodiment after the B255 burn-in region B255R illustrated in FIG. 6 is displayed for a predetermined time (e.g., 100 hours), then the W255 burn-in region W255R illustrated in FIG. 6 is displayed for a predetermined time (e.g., 100 hours) with respect to the initial luminance of the blue light-emitting element 21B included in the blue self-light-emitting pixel BPIX.

As illustrated in FIG. 9, with respect to the initial luminance of the blue light-emitting element 21B included in the blue self-light-emitting pixel BPIX of the display panel 2, both the decrease amount of the luminance of the blue light-emitting element 21B included in the blue self-light-emitting pixel BPIX of the B255 burn-in region B255R and the decrease amount of the luminance of the blue light-emitting element 21B included in the blue self-light-emitting pixel BPIX of the W255 burn-in region W255R are large, but the decrease amounts of the both are equal.

As described above, the red light-emitting element 21R included in the red self-light-emitting pixel RPIX, the green light-emitting element 21G included in the green self-light-emitting pixel GPIX, and the blue light-emitting element 21B included in the blue self-light-emitting pixel BPIX have deterioration tendencies different from one another. As illustrated in FIG. 7, the decrease amount of the luminance of the red light-emitting element 21R included in the red self-light-emitting pixel RPIX of the R255 burn-in region R255R is different from the decrease amount of the luminance of the red light-emitting element 21R included in the red self-light-emitting pixel RPIX of the W255 burn-in region W255R. As illustrated in FIG. 8, the decrease amount of the luminance of the green light-emitting element 21G included in the green self-light-emitting pixel GPIX of the G255 burn-in region G255R is different from the decrease amount of the luminance of the green light-emitting element 21G included in the green self-light-emitting pixel GPIX of the W255 burn-in region W255R.

Therefore, when the relationship between the accumulated current amount and the luminance decrease of the red light-emitting element 21R included in the red self-light-emitting pixel RPIX, which is the influence quantity indicating the influence of display of the red self-light-emitting pixel RPIX, is acquired in a red monochrome light-emitting state, the relationship between the accumulated current amount and the luminance decrease of the green light-emitting element 21G included in the green self-light-emitting pixel GPIX, which is the influence quantity indicating the influence of display of the green self-light-emitting pixel GPIX, is acquired in a green monochrome light-emitting state, and compensation is performed based on these acquired data (relationship between the accumulated current amount and the luminance decrease), the compensation can be normally performed in the red monochrome or green monochrome burn-in regions, but the compensation becomes insufficient in the W255 burn-in region W255R, and the luminance unevenness and coloring occur.

It is considered that the deterioration of the red light-emitting element 21R included in the red self-light-emitting pixel RPIX of the W255 burn-in region W255R and the deterioration of the green light-emitting element 21G included in the green self-light-emitting pixel GPIX of the W255 burn-in region W255R described above progress faster when the blue light-emitting element 21B included in the blue self-light-emitting pixel BPIX is lit at the same time as when they are lit themselves.

Since the blue light-emitting element 21B included in the blue self-light-emitting pixel BPIX is lit at the same time as when the green light-emitting element 21G included in the green self-light-emitting pixel GPIX is lit, the deterioration of the green light-emitting element 21G included in the green self-light-emitting pixel GPIX of the C255 burn-in region C255R illustrated in FIG. 6 is large similarly to the deterioration of the green light-emitting element 21G included in the green self-light-emitting pixel GPIX of the W255 burn-in region W255R.

Since the blue light-emitting element 21B included in the blue self-light-emitting pixel BPIX is lit at the same time as when the red light-emitting element 21R included in the red self-light-emitting pixel RPIX is lit, the deterioration of the red light-emitting element 21R included in the red self-light-emitting pixel RPIX of the M255 burn-in region M255R illustrated in FIG. 6 is large similarly to the deterioration of the red light-emitting element 21R included in the red self-light-emitting pixel RPIX of the W255 burn-in region W255R.

On the other hand, since the blue light-emitting element 21B included in the blue self-light-emitting pixel BPIX is not lit, the deterioration of the red light-emitting element 21R included in the red self-light-emitting pixel RPIX of the Y255 burn-in region Y255R illustrated in FIG. 6 is equal to the degree of deterioration of the red light-emitting element 21R included in the red self-light-emitting pixel RPIX of the R255 burn-in region R255R, and since the blue light-emitting element 21B included in the blue self-light-emitting pixel BPIX is not lit, the deterioration of the green light-emitting element 21G included in the green self-light-emitting pixel GPIX of the Y255 burn-in region Y255R illustrated in FIG. 6 is equal to the degree of deterioration of the green light-emitting element 21G included in the green self-light-emitting pixel GPIX of the G255 burn-in region G255R.

From the above, it is found that the deterioration amount of the red light-emitting element 21R included in the red self-light-emitting pixel RPIX and the deterioration amount of the green light-emitting element 21G included in the green self-light-emitting pixel GPIX change corresponding to the lighting status of the blue light-emitting element 21B included in the blue self-light-emitting pixel BPIX.

It is considered that the cause of such a deterioration symptom includes a plurality of factors such as current leakage and crosstalk among self-light-emitting pixels, fluctuation in display panel temperature, and reflected light of surrounding self-light-emitting pixels, and it is considered that the deterioration symptom varies depending on the structure and manufacturing process of the display panel.

Therefore, in the present embodiment, each of the influence quantity indicating the influence of display of the red self-light-emitting pixel RPIX and the influence quantity indicating the influence of display of the green self-light-emitting pixel GPIX is calculated by reflecting the display amount related to the blue self-light-emitting pixel BPIX including the blue light-emitting element 21B arranged within the same display unit range.

As illustrated in FIG. 1, the control device 4 of the display panel 2 includes an accumulation unit 5 and a compensation processing unit 8. The accumulation unit 5 includes an influence quantity data calculation unit 6 and an influence quantity data accumulation unit 7, and the compensation processing unit 8 includes a compensation data calculation unit 9, a compensation data first storage unit 10, a compensation data second storage unit 11, and a compensation unit 12.

The influence quantity data calculation unit 6 includes an R current conversion value calculation unit 6*a*, a G current conversion value calculation unit 6*b*, a B current conversion value calculation unit 6*c*, and a correction coefficient calculation unit 6*d*.

Input video signals (a red input video signal VIR, a green input video signal VIG, and a blue input video signal VIB) of each color having the predetermined gray scale value (CV) is compensated by the compensation unit 12, and become the correction video signals (the red correction video signal VIR', the green correction video signal VIG', and the blue correction video signal VIB') of each color having the compensated predetermined gray scale value (CV). The compensated predetermined gray scale value (CV) is a signal amplified to compensate for the luminance decrease, and the current value flowing through each of the red light-emitting element 21R included in the red self-light-emitting pixel RPIX, the green light-emitting element 21G included in the green self-light-emitting pixel GPIX, and the blue light-emitting element 21B included in the blue self-light-emitting pixel BPIX is also amplified. For example, there is a case where after being compensated by the compensation unit 12, the input video signal of each color having the gray scale value (CV) of 0 to 255 becomes the correction video signal of each color having the gray scale value (CV) larger than 255.

The R current conversion value calculation unit 6*a* converts the red correction video signal VIR' having the compensated predetermined gray scale value (CV) into a normalized output current value that is data indicating a display amount CR of the red light-emitting element 21R using a lookup table (LUT) storing a relationship between the input gray scale value (CV) of the red light-emitting element 21R and the normalized output current value as illustrated in FIG. 4, for example. That is, the above-described red correction video signal VIR' is converted into a current value actually flowing when a voltage corresponding to the compensated predetermined gray scale value (CV) is applied to the red light-emitting element 21R. The no such limitation is intended, and the R current conversion value calculation unit 6*a* may obtain the current value by calculation. Furthermore, the R current conversion value calculation unit 6*a* may convert the current value into a counting numerical value corresponding to the output current value, for example, a counting numerical value represented by 7 bits, and thus the current value can be easily calculated and a memory amount can be suppressed.

The G current conversion value calculation unit 6*b* converts the green correction video signal VIG' having the compensated predetermined gray scale value (CV) into a normalized output current value that is data indicating a display amount CG of the green light-emitting element 21G using the lookup table (LUT) storing a relationship between the input gray scale value (CV) of the green light-emitting element 21G and the normalized output current value as illustrated in FIG. 4, for example. That is, the above-described red correction video signal VIG' is converted into a current value actually flowing when a voltage corresponding to the compensated predetermined gray scale value (CV) is applied to the green light-emitting element 21G. The no such limitation is intended, and the G current conversion value calculation unit 6*b* may obtain the current value by calculation. Furthermore, the G current conversion value calculation unit 6*b* may convert the current value into a counting numerical value corresponding to the output current value, for example, a counting numerical value represented by 7 bits, and thus the current value can be easily calculated and a memory amount can be suppressed.

The B current conversion value calculation unit 6*c* converts the blue correction video signal VIB' having the compensated predetermined gray scale value (CV) into a normalized output current value that is data indicating a display amount CB of the blue light-emitting element 21B using the lookup table (LUT) storing a relationship between the input gray scale value (CV) of the blue light-emitting element 21B and the normalized output current value as illustrated in FIG. 4, for example. That is, the above-described red correction video signal VIB' is converted into a current value actually flowing when a voltage corresponding to the compensated predetermined gray scale value (CV) is applied to the blue light-emitting element 21B. The no such limitation is intended, and the B current conversion value calculation unit 6*c* may obtain the current value by calculation. Furthermore, the B current conversion value calculation unit 6*c* may convert the current value into a counting numerical value corresponding to the output current value, for example, a counting numerical value represented by 7 bits, and thus the current value can be easily calculated and a memory amount can be suppressed.

Using the normalized output current value that is data indicating the display amount CB of the blue light-emitting element 21B converted by the B current conversion value calculation unit 6*c*, the correction coefficient calculation unit 6*d* calculates a correction coefficient BCO1 for correcting the normalized output current value that is data indicating the display amount CR of the red light-emitting element 21R converted by the R current conversion value calculation unit 6*a*, and a correction coefficient BCO2 for correcting the normalized output current value that is data indicating the display amount CG of the green light-emitting element 21G converted by the G current conversion value calculation unit 6*b*.

In the present embodiment, a case of using the normalized output current value as the data indicating the display amount CR, CG, or CB has been described as an example, but no such limitation is intended, and the predetermined gray scale value (CV) compensated as the data indicating the display amount CR, CG, or CB may be used as it is. When the predetermined gray scale value (CV) compensated as the data indicating the display amount CR, CG, or CB may be used as it is, the R current conversion value calculation unit 6*a*, the G current conversion value calculation unit 6*b*, and the B current conversion value calculation unit 6*c* need not be included.

FIG. 10 is a view illustrating an example of the correction coefficients BCO1 and BCO2 calculated by the correction coefficient calculation unit 6*d* of the influence quantity data calculation unit 6 included in the display device 1 of the first embodiment.

In the present embodiment, as illustrated in FIG. 10, a case of using the two types of different correction coefficients BCO1 and BCO2 will be described as an example, but no such limitation is intended, and any one of the correction coefficient BCO1 and the correction coefficient BCO2 may be used.

The correction coefficient calculation unit 6*d* may derive the correction coefficients BCO1 and BCO2 using the lookup table (LUT) storing the relationship between the correction coefficients as illustrated in FIG. 10 and the compensated predetermined gray scale value (CV) or the normalized output current value that is data indicating the display amount CB of the blue light-emitting element 21B.

As illustrated in FIG. 1, the influence quantity data calculation unit 6 adds, to the influence quantity data accumulation unit 7 (short-term accumulation memory (counter)), a value in which the normalized output current value that is data indicating the display amount CR of the red light-emitting element 21R is multiplied by the correction coefficient BCO1 corresponding to the display amount CB of the blue light-emitting element 21B, adds, to the influence quantity data accumulation unit 7 (short-term accumulation memory (counter)), a value in which the normalized output current value that is data indicating the display amount CG of the green light-emitting element 21G is multiplied by the correction coefficient BCO2 corresponding to the display amount CB of the blue light-emitting element 21B, and adds, to the influence quantity data accumulation unit 7 (short-term accumulation memory (counter)), the normalized output current value that is data indicating the display amount CB of the blue light-emitting element 21B. Note that the influence quantity data accumulation unit 7 (short-term accumulation memory (counter)) may be, for example, a frame memory.

Note that in the present embodiment, a case where an accumulation value of the value in which the normalized output current value that is data indicating the display amount CR of the red light-emitting element 21R is multiplied by the correction coefficient BCO1 corresponding to the display amount CB of the blue light-emitting element 21B is used as influence quantity data RD (accumulated current amount) of the red light-emitting element 21R, and an accumulation value of the value in which the normalized output current value that is data indicating the display amount CG of the green light-emitting element 21G is multiplied by the correction coefficient BCO2 corresponding to the display amount CB of the blue light-emitting element 21B is used as influence quantity data GD (accumulated current amount) of the green light-emitting element 21G has been described as an example, but no such limitation is intended. For example, since the display amount CR of the red light-emitting element 21R is not considered as the influence quantity data RD (accumulated current amount) of the red light-emitting element 21R, the normalized output current value that is data indicating the display amount CR of the red light-emitting element 21R may be always fixed to 1, and an accumulation value of a value in which the normalized output current value fixed to 1 is multiplied by the correction coefficient BCO1 corresponding to the display amount CB of the blue light-emitting element 21B may be used, and since the display amount CG of the green light-emitting element 21G is not considered as the influence quantity data GD (accumulated current amount) of the green light-emitting element 21G, the normalized output current value that is data indicating the display amount CG of the green light-emitting element 21G may be always fixed to 1, and an accumulation value of a value in which the normalized output current value fixed to 1 is multiplied by the correction coefficient BCO2 corresponding to the display amount CB of the blue light-emitting element 21B may be used.

The compensation data calculation unit 9 calculates correction data RD' related to the correction amount of the red light-emitting element 21R based on the influence quantity data RD (accumulated current amount) of the red light-emitting element 21R from the influence quantity data accumulation unit 7 (short-term accumulation memory (counter)), calculates correction data GD' related to the correction amount of the green light-emitting element 21G based on the influence quantity data GD (accumulated current amount) of the green light-emitting element 21G from the influence quantity data accumulation unit 7 (short-term accumulation memory (counter)), and calculates correction data BD' related to the correction amount of the blue light-emitting element 21B based on the influence quantity data BD (accumulated current amount) of the blue light-emitting element 21B from the influence quantity data accumulation unit 7 (short-term accumulation memory (counter)).

The compensation data calculation unit 9 may derive the correction data RD' related to the correction amount of the red light-emitting element 21R, the correction data GD' related to the correction amount of the green light-emitting element 21G, and the correction data BD' related to the correction amount of the blue light-emitting element 21B using a lookup table (LUT) illustrated in FIG. 5 storing the relationship between the accumulated current amount and the luminance of the red light-emitting element 21R, the green light-emitting element 21G, and the blue light-emitting element 21B, for example. Note that the correction amount can be decided to be the initial luminance of each color light-emitting element, for example.

The correction data RD' related to the correction amount of the red light-emitting element 21R, the correction data GD' related to the correction amount of the green light-emitting element 21G, and the correction data BD' related to the correction amount of the blue light-emitting element 21B calculated by the compensation data calculation unit 9 are stored in the compensation data first storage unit 10 and the compensation data second storage unit 11. The compensation data second storage unit 11 is a backup storage unit configured to save data when the power supply of the display device 1 is turned off or the like, and may be configured by, for example, a flash memory or the like, and may be included as necessary.

The compensation unit 12 compensates for the input video signal (the red input video signal VIR, the green input video signal VIG, and the blue input video signal VIB) of each color having the predetermined gray scale value (CV) to the correction video signal (the red correction video signal VIR', the green correction video signal VIG', and the blue correction video signal VIB') of each color having the compensated predetermined gray scale value (CV) based on the correction data RD' related to the correction amount of the red light-emitting element 21R, the correction data GD' related to the correction amount of the green light-emitting element 21G, and the correction data BD' related to the correction amount of the blue light-emitting element 21B from the compensation data first storage unit 10.

According to the display device 1, also in the case of aging (burn-in) with the burn-in display pattern as illustrated in FIG. 6, the compensation amount of monochrome deterioration is reflected in the R255 burn-in region R255R and the G255 burn-in region G255R, and the compensation amount amplified from the monochrome deterioration is reflected in the W255 burn-in region W255R, the compensation insufficiency in the W255 burn-in region W255R, the C255 burn-in region C255R, and the M255 burn-in region M255R is eliminated, and the luminance unevenness and color deviation can be suppressed.

In the present embodiment, a method of performing correction in consideration of the influence from the blue self-light-emitting pixel BPIX to the red self-light-emitting pixel RPIX and the influence from the blue self-light-emitting pixel BPIX to the green self-light-emitting pixel GPIX based on the result of the aging test conducted by the inventors of the disclosure, but the disclosure is not limited to this, and in a case where the red self-light-emitting pixel RPIX, the green self-light-emitting pixel GPIX, and the blue self-light-emitting pixel BPIX mutually influence, the correction may be performed in consideration of these influences.

Note that the correction data RD' related to the correction amount of the red light-emitting element 21R, the correction data GD' related to the correction amount of the green light-emitting element 21G, and the correction data BD' related to the correction amount of the blue light-emitting element 21B that are calculated by the compensation data calculation unit 9 are not limited to the correction amount in the positive direction that compensates for the decrease in the luminance of the red light-emitting element 21R, the green light-emitting element 21G, and the blue light-emitting element 21B, and may be the correction amount in the negative direction when a luminance increase due to recovery of the element characteristics of the light-emitting element is generated as the characteristics of the display panel, for example. That is, the correction amount may compensate for a temporal change.

Note that, as described above, the deterioration of the red light-emitting element 21R included in the red self-light-emitting pixel RPIX of the W255 burn-in region W255R and the deterioration of the green light-emitting element 21G included in the green self-light-emitting pixel GPIX of the W255 burn-in region W255R illustrated in FIG. 6 progress faster when the blue light-emitting element 21B included in the blue self-light-emitting pixel BPIX is lit at the same time as when they are lit themselves. On the other hand, in the B255 burn-in region B255R illustrated in FIG. 6, even when the blue light-emitting element 21B included in the blue self-light-emitting pixel BPIX is lit, deterioration did not occur in the red light-emitting element 21R included in the red self-light-emitting pixel RPIX that is not lit and the green light-emitting element 21G included in the green self-light-emitting pixel GPIX. Therefore, when the red light-emitting element 21R included in the red self-light-emitting pixel RPIX and the green light-emitting element 21G included in the green self-light-emitting pixel GPIX are not lit, 0 is preferably used as the normalized output current value that is the data indicating the display amount CR of the red light-emitting element 21R and the normalized output current value that is the data indicating the display amount CG of the green light-emitting element 21G. That is, the influence quantity data accumulation unit 7 included in the accumulation unit 5 preferably accumulates the influence quantity data of the self-light-emitting pixel in a state of outputting light among the red self-light-emitting pixel RPIX and the green self-light-emitting pixel GPIX.

FIG. 11 is a flowchart showing influence quantity data accumulation processing (S2) to compensation data update processing (S4) performed by the control device 4 included in the display device 1 of the first embodiment.

In accumulation period judgement processing (S1), it is judged whether the correction video signal is a specific frame, and the influence quantity data accumulation processing (S2) is performed every predetermined accumulation period (e.g., 15 frame=0.25 seconds).

In the influence quantity data accumulation processing (S2), for example, as described above with reference to FIG. 1, a value in which the normalized output current value that is data indicating the display amount CR of the red light-emitting element 21R is multiplied by the correction coefficient BCO1 corresponding to the display amount CB of the blue light-emitting element 21B, a value in which the normalized output current value that is data indicating the display amount CG of the green light-emitting element 21G is multiplied by the correction coefficient BCO2 corresponding to the display amount CB of the blue light-emitting element 21B, and the normalized output current value that is data indicating the display amount CB of the blue light-emitting element 21B are calculated for each self-light-emitting pixel of each color with respect to a correction video signal displayed for every 15 frames such as the 1st frame, the 16th frame, the 31st frame, . . . , and the like, and addition (count) to the influence quantity data accumulation unit (short-term accumulation memory) is performed, whereby the influence quantity data RD (accumulated current amount) of the red light-emitting element 21R, the influence quantity data GD (accumulated current amount) of the green light-emitting element 21G, and the influence quantity data BD (accumulated current amount) of the blue light-emitting element 21B that have been updated can be obtained.

In count value determination processing (S3), it is determined for each self-light-emitting pixel of each color whether the influence quantity data RD (accumulated current amount) of the red light-emitting element 21R, the influence quantity data GD (accumulated current amount) of the green light-emitting element 21G, and the influence quantity data BD (accumulated current amount) of the blue light-emitting element 21B newly obtained by the influence quantity data accumulation processing (S2) are equal to or more than a threshold.

When the influence quantity data RD (accumulated current amount) of the red light-emitting element 21R, the influence quantity data GD (accumulated current amount) of the green light-emitting element 21G, and the influence quantity data BD (accumulated current amount) of the blue light-emitting element 21B newly obtained by the influence quantity data accumulation processing (S2) exceed a threshold set in advance, it is judged that the deterioration has progressed to some extent, and the processing proceeds to the compensation data update processing (S4).

In the compensation data update processing (S4), the value of the influence quantity data accumulation unit (short-term accumulation memory) is reset, and new accumulation is started. For the compensation data, that is, the correction data RD' related to the correction amount of the red light-emitting element 21R, the correction data GD' related to the correction amount of the green light-emitting element 21G, and the correction data BD' related to the correction amount of the blue light-emitting element 21B, a value corresponding to a correction voltage with which the target luminance can be obtained may be calculated in view of how much the deterioration has progressed from the current compensation data in accordance with the threshold. The compensation data may be simply calculated by adding a predetermined value determined by the threshold. However, strictly speaking, there can be a case where the progress is different between an initial stage and a late stage of deterioration, and therefore, an addition amount may be calculated and decided based on a current compensation data value, or may be derived using a lookup table (LUT).

In the present embodiment, as described above, a case where the influence quantity data accumulation processing (S2) is performed, for example, every 15 frames has been described as an example, but no such limitation is intended, and for example, the influence quantity data accumulation processing (S2) may be performed every frame. The compensation data update processing (S4) may also be performed every frame, for example.

Note that after conducting the aging (burn-in) test under the following conditions using the display device 1 illustrated in FIG. 1 before use, by confirming the current value flowing through the light-emitting element included in each self-light-emitting pixel of the display device 1 in a state where a predetermined display pattern is displayed, or the voltage value applied to the light-emitting element, it is possible to confirm that the control device 4 of the display panel 2 and the control method for the display panel 2 that can perform correction that highly accurately reflects the level of the temporal change (deterioration) due to the influence of the adjacent pixel can be achieved.

For example, in the display region DA of the display panel 2, each of a first region including 10,000 self-light-emitting pixels of by 100 in the vertical direction×100 in the horizontal direction and a second region including 10,000 self-light-emitting pixels of by 100 in the vertical direction×100 in the horizontal direction can be displayed in a burn-in display pattern described below. Note that the first region and the second region displayed in the display region DA of the display panel 2 are preferably separated from each other by a predetermined distance, but the first region and the second region may be continuously provided regions.

For example, in the first region, yellow display, that is, gray scale of each color self-light-emitting pixel in the first region is continuously displayed for 100 hours with (R, G, B)=(255, 255, 0). On the other hand, for example, in the second region, white display, that is, gray scale of each color self-light-emitting pixel in the second region is continuously displayed for 100 hours with (R, G, B)=(255, 255, 255). The no such limitation is intended, and for example, in the first region, red display, that is, gray scale of each color self-light-emitting pixel in the first region may be continuously displayed for 100 hours with (R, G, B)=(255, 0, 0), and in the second region, magenta display may be continued, that is, the gray scale of each color self-light-emitting pixel in the second region may be continuously displayed for 100 hours with (R, G, B)=(255, 0, 255). Here, for example, a case where processing is performed with 8-bit gray scale, the minimum gray scale value is 0 gray scales, and the maximum gray scale value is 255 gray scales will be described as an example, but no such limitation is intended.

As described above, after the first region and the second region are continuously displayed for 100 hours, deterioration of the light emission efficiency of the red light-emitting element 21R included in the red self-light-emitting pixel RPIX included in the second region is larger than deterioration of the light emission efficiency of the red light-emitting element 21R included in the red self-light-emitting pixel RPIX included in the first region.

Thereafter, when each of the red self-light-emitting pixel RPIX included in the first region and the red self-light-emitting pixel RPIX included in the second region is displayed at the maximum gray scale value, for example, 255 gray scales, the control device 4 included in the display device 1 makes a current flowing through the red self-light-emitting pixel RPIX included in the second region, that is, the red light-emitting element 21R included in the red self-light-emitting pixel RPIX included in the second region greater than a current flowing through the red self-light-emitting pixel RPIX included in the first region, that is, the red light-emitting element 21R included in the red self-light-emitting pixel RPIX included in the first region.

Here, a case where after the first region and the second region are continuously displayed for 100 hours, each of the red self-light-emitting pixel RPIX included in the first region and the red self-light-emitting pixel RPIX included in the second region is displayed at 255 gray scales has been described as an example, but no such limitation is intended. For example, in a case where after the first region and the second region are continuously displayed for 100 hours, each of the red self-light-emitting pixel RPIX and the green self-light-emitting pixel GPIX included in the first region and the red self-light-emitting pixel RPIX and the green self-light-emitting pixel GPIX included in the second region is displayed at 255 gray scales, or each of the red self-light-emitting pixel RPIX, the green self-light-emitting pixel GPIX, and the blue self-light-emitting pixel BPIX included in the first region and the red self-light-emitting pixel RPIX, the green self-light-emitting pixel GPIX, and the blue self-light-emitting pixel BPIX included in the second region is displayed at 255 gray scales, the control device 4 included in the display device 1 makes a current flowing through the red self-light-emitting pixel RPIX and the green self-light-emitting pixel GPIX included in the second region, that is, the red light-emitting element 21R included in the red self-light-emitting pixel RPIX and the green light-emitting element 21G included in the green self-light-emitting pixel GPIX included in the second region greater than a current flowing through the red self-light-emitting pixel RPIX and the green self-light-emitting pixel GPIX included in the first region, that is, the red light-emitting element 21R included in the red self-light-emitting pixel RPIX and the green light-emitting element 21G included in the green self-light-emitting pixel GPIX included in the first region.

Second Embodiment

Next, the second embodiment of the disclosure will be described with reference to FIGS. 12 to 16. The present embodiment is different from the above-described first embodiment in that a control device 4' included in a display device 1' of the present embodiment includes a two-dimensional correction coefficient calculation unit **6*d'* and a delay line memory 28**. The others are as described in the first embodiment. For convenience of description, members having the same functions as those illustrated in the drawings of the first embodiment are denoted by the same reference signs and signs, and descriptions thereof will be omitted.

FIG. 12 is a view illustrating a schematic configuration of a display panel 2' included in a display device 1' of the second embodiment and a control device 4' of the display panel 2'.

The control device 4' included in the display device 1' illustrated in FIG. 12 is different from the display device 1 of the first embodiment described above in including the two-dimensional correction coefficient calculation unit **6*d'* and the delay line memory 28**.

In the display device 1' of the present embodiment, the control device 4' includes the two-dimensional correction coefficient calculation unit **6*d'* in consideration of the fact that, for example, by continuously lighting the blue light-emitting element 21B included in the blue self-light-emitting pixel BPIX for a long time, even the light-emitting element included in the self-light-emitting pixel in a region away by several display units has an influence of deterioration. Such a deterioration symptom varies in presence and absence of occurrence and the degree of influence depending on the structure of the self-light-emitting pixel of the display panel, the current amount flowing through the light-emitting element included in the self-light-emitting pixel, the environmental temperature, and the like, but in particular, in a case where a high current (high current at which the white maximum luminance of the display panel is 1000 nit) continues to flow for a long time (e.g., 1000 h) at a high environmental temperature (e.g., 85° C. or the like), deterioration such as smearing occurs to a non-lighting region away by more than a dozen of self-light-emitting pixels from the periphery of a region where the plurality of blue light-emitting elements 21B are lit, that is, the boundary of the region where the plurality of blue light-emitting elements 21**B are lit.

FIG. 13 is a view illustrating an ideally burned in display state in a case where Gray display is performed on the entire surface after the burn-in display pattern illustrated in FIG. 6 is displayed for a predetermined time (e.g., some hundred hours). As illustrated in FIG. 13, in this case, any burn-in region shows an ideal display state in which no smearing deterioration occurs.

Since only the red light-emitting element 21R included in the red self-light-emitting pixel RPIX deteriorates and a luminance decrease occurs, the R255 burn-in region R255R appears as light cyan. Since only the green light-emitting element 21G included in the green self-light-emitting pixel GPIX deteriorates and a luminance decrease occurs, the G255 burn-in region G255R appears as light magenta. Since only the blue light-emitting element 21B included in the blue self-light-emitting pixel BPIX deteriorates and a luminance decrease occurs, the B255 burn-in region B255R appears as light yellow. Since the green light-emitting element 21G included in the green self-light-emitting pixel GPIX and the blue light-emitting element 21B included in the blue self-light-emitting pixel BPIX deteriorate and a luminance decrease occurs, the C255 burn-in region C255R appears as light red. Since the red light-emitting element 21R included in the red self-light-emitting pixel RPIX and the blue light-emitting element 21B included in the blue self-light-emitting pixel BPIX deteriorate and a luminance decrease occurs, the M255 burn-in region M255R appears as light green. Since the red light-emitting element 21R included in the red self-light-emitting pixel RPIX and the green light-emitting element 21G included in the green self-light-emitting pixel GPIX deteriorate and a luminance decrease occurs, the Y255 burn-in region Y255R appears as light blue. Since the red light-emitting element 21R included in the red self-light-emitting pixel RPIX, the green light-emitting element 21G included in the green self-light-emitting pixel GPIX, and the blue light-emitting element 21B included in the blue self-light-emitting pixel BPIX deteriorate and a luminance decrease occurs, the W255 burn-in region W255R appears as gray (Deep Gray) deeper than in a part where burn-in does not occur.

(a), (b), and (c) of FIG. 14 are examples of the result of the aging (burn-in) test of the display panel 2' conducted by the inventors of the disclosure. Note that the display panel 2' used here has characteristics different from those of the display panel 2 used in the aging (burn-in) test conducted regarding the first embodiment, and therefore the result of the aging (burn-in) test is also different.

(a) of FIG. 14 is a view illustrating a display state in a case where red monochrome display is performed on the entire surface after the burn-in display pattern illustrated in FIG. 6 is displayed for a predetermined time (e.g., some hundred hours), (b) of FIG. 14 is a view illustrating a display state in a case where green monochrome display is performed on the entire surface after the burn-in display pattern illustrated in FIG. 6 is displayed for a predetermined time (e.g., some hundred hours), and (c) of FIG. 14 is a view illustrating a display state in a case where blue monochrome display is performed on the entire surface after the burn-in display pattern illustrated in FIG. 6 is displayed for a predetermined time (e.g., some hundred hours).

The deterioration symptom such as smearing occurs because the red light-emitting element 21R included in the red self-light-emitting pixel RPIX and the green light-emitting element 21G included in the green self-light-emitting pixel GPIX that are not lit deteriorate when the burn-in region including the plurality of blue light-emitting elements 21B is continuously lit. Such deterioration symptoms vary in the presence and absence of occurrence of the symptoms and the influence range on the surroundings depending on the structure and manufacturing process of the self-light-emitting pixel of the display panel, the optical film and glass provided on the entire surface, and aging conditions (luminance and temperature). The symptoms illustrated in (a), (b), and (c) of FIG. 14 are examples of symptoms when aging is applied for a long time under a certain condition.

As illustrated in (a) of FIG. 14, in a case where red monochrome display is performed on the entire surface after the burn-in display pattern illustrated in FIG. 6 is displayed for a predetermined time (e.g., some hundred hours), in the R255 burn-in region R255R and the Y255 burn-in region Y255R, the red light-emitting element 21R included in the red self-light-emitting pixel RPIX deteriorates and a luminance decrease occurs, and therefore burn-in due to a luminance decrease of a rectangular shape is seen. On the other hand, in regions burned in by lighting the blue light-emitting element 21B, such as the B255 burn-in region B255R, the W255 burn-in region W255R, the C255 burn-in region C255R, and the M255 burn-in region M255R, a luminance decrease such as smearing is seen around the burn-in regions B255R, W255R, C255R, and M255R. This means that while the blue light-emitting element 21B is lit and aged, an influence is given also to the red light-emitting element 21R included in the red self-light-emitting pixel RPIX in some way, and the deterioration is progressing. Since deterioration such as smearing is not observed in the Y255 burn-in region Y255R, it can be said that there is no influence even if the green light-emitting element 21G is lit on and aged.

As illustrated in (b) of FIG. 14, in a case where green monochrome display is performed on the entire surface after the burn-in display pattern illustrated in FIG. 6 is displayed for a predetermined time (e.g., some hundred hours), in the G255 burn-in region G255R and the Y255 burn-in region Y255R, the green light-emitting element 21G included in the green self-light-emitting pixel GPIX deteriorates and a luminance decrease occurs, and therefore burn-in due to a luminance decrease of a rectangular shape is seen. On the other hand, in regions burned in by lighting the blue light-emitting element 21B, such as the B255 burn-in region B255R, the W255 burn-in region W255R, the C255 burn-in region C255R, and the M255 burn-in region M255R, a luminance decrease such as smearing is seen around the burn-in regions B255R, W255R, C255R, and M255R. This means that while the blue light-emitting element 21B is lit and aged, an influence is given also to the green light-emitting element 21G included in the green self-light-emitting pixel GPIX in some way, and the deterioration is progressing. Since deterioration such as smearing is not observed in the Y255 burn-in region Y255R, it can be said that there is no influence even if the red light-emitting element 21R is lit on and aged.

As illustrated in (c) of FIG. 14, in a case where blue monochrome display is performed on the entire surface after the burn-in display pattern illustrated in FIG. 6 is displayed for a predetermined time (e.g., some hundred hours), in regions burned in by lighting the blue light-emitting element 21B, such as the B255 burn-in region B255R, the W255 burn-in region W255R, the C255 burn-in region C255R, and the M255 burn-in region M255R, the blue light-emitting element 21B included in the blue self-light-emitting pixel BPIX deteriorates and a luminance decrease occurs, and therefore only burn-in due to a luminance decrease of a rectangular shape is seen. That is, deterioration such as smearing does not occur around the burn-in regions B255R, W255R, C255R, M255R, and an ideal display state is achieved.

The control device 4' included in the display device 1' illustrated in FIG. 12 includes the two-dimensional correction coefficient calculation unit **6*d*'** in order to improve the smearing occurring around the burn-in regions described above.

(a) of FIG. 15 is a view illustrating a degree of influence of a specific self-light-emitting pixel (the blue light-emitting element 21B included in the blue self-light-emitting pixel BPIX) on surrounding self-light-emitting pixels in a horizontal direction and a vertical direction, (b) of FIG. 15 is a view illustrating a degree of influence of a specific self-light-emitting pixel (the blue light-emitting element 21B included in the blue self-light-emitting pixel BPIX) on surrounding self-light-emitting pixels in the horizontal direction, and (c) of FIG. 15 is a view illustrating a degree of influence of a specific self-light-emitting pixel (the blue light-emitting element 21B included in the blue self-light-emitting pixel BPIX) on surrounding self-light-emitting pixels in the vertical direction.

The influence of the specific self-light-emitting pixel (the blue light-emitting element 21B included in the blue self-light-emitting pixel BPIX) on the surrounding self-light-emitting pixels can be grasped in advance, and the range and the degree of influence of the blue light-emitting element 21B included in one blue self-light-emitting pixel BPIX, for example, on the surrounding self-light-emitting pixels can be created as a two-dimensional lookup table (LUT) of horizontal 17 taps×vertical 11 taps as illustrated in (a) of FIG. 15. Note that here, the tap number means the number of self-light-emitting pixels. As illustrated in (a), (b), and (c) of FIG. 15, the influence quantity indicating the influence of display related to each of a plurality of self-light-emitting pixels surrounding the specific self-light-emitting pixel (the blue light-emitting element 21B included in the blue self-light-emitting pixel BPIX) is preferably calculated and the larger the distance between the specific self-light-emitting pixel (the blue light-emitting element 21B included in the blue self-light-emitting pixel BPIX) and each of the plurality of self-light-emitting pixels of the surrounding is, the less the influence of the specific self-light-emitting pixel (the blue light-emitting element 21B included in the blue self-light-emitting pixel BPIX) on the influence quantity.

The two-dimensional correction coefficient calculation unit 6*d*' illustrated in FIG. 12 can calculate two-dimensional correction coefficients BCO1' and BCO2' using influence degree coefficients shown in (b) and (c) of FIG. 15 corresponding to the lighting status of the blue light-emitting element 21B included in the blue self-light-emitting pixel BPIX.

The two-dimensional correction coefficient calculation unit 6*d*' illustrated in FIG. 12 can calculate the two-dimensional correction coefficients BCO1' and BCO2' using an influence degree coefficient of the two-dimensional lookup table (LUT) shown in (a) of FIG. 15 corresponding to the lighting status of the blue light-emitting element 21B included in the blue self-light-emitting pixel BPIX. More specifically, the two-dimensional correction coefficients BCO1' and BCO2' are calculated by multiplying the display amount CB of the blue light-emitting element 21B included in the blue self-light-emitting pixel BPIX that is a calculation target by the influence degree coefficient of the two-dimensional lookup table (LUT) shown in (a) of FIG. 15. Then, a convolution operation is performed, the convolution operation of adding each value of the two-dimensional correction coefficients BCO1' and BCO2' to the display amount CR of the red light-emitting element 21R or the display amount CG of the green light-emitting element 21G at the target coordinates.

As illustrated in FIG. 12, in the influence quantity data calculation unit 6', a value in which the two-dimensional correction coefficient BCO1' is added to the normalized output current value, which is data indicating the display amount CR of the red light-emitting element 21R, is added to the influence quantity data accumulation unit 7 (short-term accumulation memory (counter)), a value in which the two-dimensional correction coefficient BCO2' is added to the normalized output current value, which is data indicating the display amount CG of the green light-emitting element 21G, is added to the influence quantity data accumulation unit 7 (short-term accumulation memory (counter)), and the normalized output current value, which is data indicating the display amount CB of the blue light-emitting element 21B, is added to the influence quantity data accumulation unit 7 (short-term accumulation memory (counter)). The correction video signals VIR' and VIG' are stored in the delay line memory 28, and the R current conversion value calculation unit 6*a* and the G current conversion value calculation unit 6*b* sequentially read, from the delay line memory 28, the correction video signals VIR' and VIG' related to the self-light-emitting pixel for which the two-dimensional correction coefficients BCO1' and BCO2' have been calculated, and performs conversion of the accumulated current amount.

In the two-dimensional correction coefficient calculation unit 6*d*', a line memory compatible with vertical 11 taps, for example, may be prepared, and the two-dimensional correction coefficients BCO1' and BCO2' may be calculated using a two-dimensional lookup table (LUT).

In the present embodiment, the influence of deterioration from the blue light-emitting element 21B included in the blue self-light-emitting pixel BPIX is affected regardless of the lighting statuses of the red light-emitting element 21R included in the red self-light-emitting pixel RPIX and the green light-emitting element 21G included in the green self-light-emitting pixel GPIX. That is, they are affected even if the red light-emitting element 21R included in the red self-light-emitting pixel RPIX and the green light-emitting element 21G included in the green self-light-emitting pixel GPIX are not lit. Therefore, in the control device 4' of the present embodiment, the value in which the two-dimensional correction coefficient BCO1' is added to the normalized output current value, which is data indicating the display amount CR of the red light-emitting element 21R, is added to the influence quantity data accumulation unit 7 (short-term accumulation memory (counter)), and the value in which the two-dimensional correction coefficient BCO2' is added to the normalized output current value, which is data indicating the display amount CG of the green light-emitting element 21G, is added to the influence quantity data accumulation unit 7 (short-term accumulation memory (counter)).

FIG. 16 is a flowchart showing influence quantity data accumulation processing (S12) to compensation data update processing (S14) performed by the control device 4' included in the display device 1' of the second embodiment.

Accumulation period judgement processing (S11) shown in FIG. 16 is the same as the accumulation period judgement processing (S1) described above in the first embodiment, count value determination processing (S13) shown in FIG. 16 is the same as the count value determination processing (S3) described above in the first embodiment, and compensation data update processing (S14) shown in FIG. 16 is the same as the compensation data update processing (S4) described above in the first embodiment, and therefore the description thereof is omitted here.

In the influence quantity data accumulation processing (S12) shown in FIG. 16, for example, as described above with reference to FIG. 12, a value in which the normalized output current value that is data indicating the display amount CR of the red light-emitting element 21R is added to the two-dimensional correction coefficient BCO1' corresponding to the display amount CB of the blue light-emitting element 21B, a value in which the normalized output current value that is data indicating the display amount CG of the green light-emitting element 21G is added to the two-dimensional correction coefficient BCO2' corresponding to the display amount CB of the blue light-emitting element 21B, and the normalized output current value that is data indicating the display amount CB of the blue light-emitting element 21B are calculated for each self-light-emitting pixel of each color with respect to a correction video signal displayed for every 15 frames such as the 1st frame, the 16th frame, the 31st frame, . . . , and the like, and addition (count) to the influence quantity data accumulation unit (short-term accumulation memory) is performed, whereby the influence quantity data RD (accumulated current amount) of the red light-emitting element 21R, the influence quantity data GD (accumulated current amount) of the green light-emitting element 21G, and the influence quantity data BD (accumulated current amount) of the blue light-emitting element 21B that have been updated can be obtained.

In the present embodiment, as described above, a case of adding the two-dimensional correction coefficients BCO1' and BCO2' has been described as an example, but no such limitation is intended, and the two-dimensional correction coefficients BCO1' and BCO2' may be multiplied in a case where an actual influence is exerted by multiplication.

Third Embodiment

Next, the third embodiment of the disclosure will be described with reference to FIG. 17. The present embodiment is different from the above-described second embodiment in that a display panel 2" included in a display device 1" of the present embodiment includes a temperature sensor 30, and the two-dimensional correction coefficient calculation unit 6*d*' calculates two-dimensional correction coefficients BCO1" and BCO2" based on information SIN of the temperature sensor from the temperature sensor 30. The others are as described in the second embodiment. For convenience of description, members having the same functions as those illustrated in the drawings of the second embodiment are denoted by the same reference signs and signs, and descriptions thereof will be omitted.

FIG. 17 is a view illustrating a schematic configuration of a display panel 2" included in a display device 1" of the third embodiment and the control device 4" of the display panel 2".

As illustrated in FIG. 17, the display panel 2" included in the display device 1" includes the temperature sensor 30. Then, the two-dimensional correction coefficient calculation unit 6*d*' included in the control device 4" of the display panel 2" calculates the two-dimensional correction coefficients BCO1" and BCO2" based on the information SIN of the temperature sensor from the temperature sensor 30.

The current amount flowing through the light-emitting element of each color increases or decreases depending on the temperature state of the display panel 2" (the higher the temperature becomes, the more the flowing current amount increases). Therefore, for example, it is preferable that the temperature sensor 30 is provided around or on the back surface of the display panel 2", and the two-dimensional correction coefficient calculation unit 6*d*' calculates the two-dimensional correction coefficients BCO1" and BCO2" based on the information SIN of the temperature sensor from the temperature sensor 30. In the present embodiment, a case where the two-dimensional correction coefficient calculation unit 6*d*' calculates the two-dimensional correction coefficients BCO1" and BCO2" based on the information SIN of the temperature sensor from the temperature sensor 30 will be described as an example, but no such limitation is intended, and the correction coefficient calculation unit 6*d* described above in the first embodiment may calculate the correction coefficients BCO1 and BCO2 based on the information SIN of the temperature sensor from the temperature sensor 30.

The influence degree of the blue light-emitting element 21B included in the blue self-light-emitting pixel BPIX on the red light-emitting element 21R included in the red self-light-emitting pixel RPIX and the green light-emitting element 21G included in the green self-light-emitting pixel GPIX, which are surrounding self-light-emitting pixels, varies depending on the temperature of the display panels 2, 2', or 2". For example, when the temperature of the display panels 2, 2', or 2" is high, the range of the self-light-emitting pixels that have an influence tends to be widened, and the deterioration amount tends to increase. Ideally, the two-dimensional lookup table (LUT) described above in the second embodiment may be created in accordance with the maximum range of thermally affecting self-light-emitting pixels, and the two-dimensional correction coefficient from the two-dimensional lookup table (LUT) may be further multiplied by a temperature coefficient based on the information SIN of the temperature sensor from the temperature sensor 30 included in the display panel 2, 2', or 2" for use. For example, the temperature coefficients of all the self-light-emitting pixels within the maximum range of thermally affecting self-light-emitting pixels may be set to 100 when the information SIN of the temperature sensor is equal to or higher than 80° C., and the temperature coefficients of all the self-light-emitting pixels within the maximum range of thermally affecting self-light-emitting pixels may be set to 0 when the information SIN of the temperature sensor is equal to or lower than 25° C.

Supplement

First Aspect

A control device for a display panel including a plurality of first self-light-emitting pixels that output first color light and a plurality of second self-light-emitting pixels that output second color light different from the first color light, in which the plurality of first self-light-emitting pixels are arranged, within a predetermined range, corresponding respectively to the second self-light-emitting pixel that corresponds among the plurality of second self-light-emitting pixels, and the control device includes an accumulation unit configured to accumulate an influence quantity calculated based on a display amount related to the first self-light-emitting pixel arranged within the predetermined range with respect to the second self-light-emitting pixel, the influence quantity indicating an influence of display of a second self-light-emitting pixel corresponding to the first self-light-emitting pixel, and a compensation processing unit configured to generate a correction video signal by compensating for an input video signal relative to a temporal change of each of the second self-light-emitting pixels based on the influence quantity related to each of the plurality of second self-light-emitting pixels.

Second Aspect

The control device according to the first aspect, in which the influence quantity related to each of the plurality of second self-light-emitting pixels is calculated based on a display amount related to the first self-light-emitting pixel arranged, within the predetermined range, corresponding respectively to the second self-light-emitting pixels and a display amount related to the second self-light-emitting pixel itself.

Third Aspect

The control device according to the first or second aspect, in which the accumulation unit accumulates the influence quantity of the second self-light-emitting pixel in a state of outputting the second color light among the plurality of second self-light-emitting pixels.

Fourth Aspect

The control device according to any of the first to third aspects, in which the influence quantity related to each of the plurality of second self-light-emitting pixels is calculated, and as a distance between the second self-light-emitting pixel and the first self-light-emitting pixel arranged within the predetermined range is large, an influence of a display amount related to the first self-light-emitting pixel on the influence quantity is less.

Fifth Aspect

The control device according to any of the first to fourth aspects, in which the first color light is light having a shorter wavelength than a wavelength of the second color light, the accumulation unit further accumulates an influence quantity indicating an influence of display related to each of the plurality of first self-light-emitting pixels calculated based on a display amount related to the first self-light-emitting pixel itself, and the compensation processing unit generates a correction video signal by further compensating for the input video signal relative to a temporal change of each of the plurality of first self-light-emitting pixels based on the influence quantity related to each of the plurality of first self-light-emitting pixels.

Sixth Aspect

The control device according to any of the first to fifth aspects, in which the first color light is blue light, and the second color light is red light or green light.

Seventh Aspect

The control device according to any of the first to fourth aspects, in which the first color light is light having a longer wavelength than a wavelength of the second color light.

Eighth Aspect

The control device according to any of the first to seventh aspects, in which the display amount is data related to a current amount flowing through the self-light-emitting pixel.

Ninth Aspect

A display device comprising: the control device according to any of the first to eighth aspects; the display panel; and a display control unit configured to perform display on the display panel based on the correction video signal.

Tenth Aspect

The display device according to the ninth aspect, in which the display panel includes a sensor configured to measure a temperature of the display panel, and in the control device, the influence quantity is calculated to be large as a temperature measured by the sensor is high.

Eleventh Aspect

The display device according to the tenth aspect, in which each of the plurality of first self-light-emitting pixels of the display panel includes a first self-light-emitting element, each of the plurality of second self-light-emitting pixels of the display panel includes a second self-light-emitting element, and each of the first self-light-emitting element and the second self-light-emitting element includes an organic light-emitting layer or a light-emitting layer including quantum dots.

Twelfth Aspect

A control method for a display panel including a plurality of first self-light-emitting pixels that output first color light and a plurality of second self-light-emitting pixels that output second color light different from the first color light, in which the plurality of first self-light-emitting pixels are arranged, within a predetermined range, respectively corresponding to the second self-light-emitting pixel that corresponds among the plurality of second self-light-emitting pixels, and the control method includes an accumulation process of accumulating an influence quantity calculated based on a display amount related to each of the plurality of first self-light-emitting pixels arranged, within the predetermined range, respectively corresponding to the second self-light-emitting pixel, the influence quantity indicating an influence of display of the second self-light-emitting pixel corresponding to the first self-light-emitting pixel, and a compensation processing process of generating a correction video signal by compensating for an input video signal relative to a temporal change of each of the second self-light-emitting pixels based on the influence quantity related to each of the plurality of second self-light-emitting pixels.

Thirteenth Aspect

The control method for a display panel according to the twelfth aspect, in which in the accumulating, the influence quantity related to each of the plurality of second self-light-emitting pixels is calculated based on a display amount related to each of the plurality of first self-light-emitting pixels arranged, within the predetermined range, corresponding respectively to the second self-light-emitting pixels and a display amount related to each of the plurality of second self-light-emitting pixels itself.

Fourteenth Aspect

A control device for a display panel including a first self-light-emitting pixel configured to output first color light and a second self-light-emitting pixel configured to output second color light different from the first color light, the control device in which in a first region including a predetermined number of the first self-light-emitting pixels and a predetermined number of the second self-light-emitting pixels on the display panel, the first self-light-emitting pixels are displayed with a minimum gray scale value and the second self-light-emitting pixels are displayed with a maximum gray scale value for a predetermined time, in a second region including the predetermined number of the first self-light-emitting pixels and the predetermined number of the second self-light-emitting pixels on the display panel, the second region being different from the first region, each of the first self-light-emitting pixels and the second self-light-emitting pixels is displayed with the maximum gray scale value for the predetermined time, and then when each of the second self-light-emitting pixels included in the first region and the second self-light-emitting pixels included in the second region is displayed with the maximum gray scale value, a current flowing through the second self-light-emitting pixels included in the second region is made larger than a current flowing through the second self-light-emitting pixels included in the first region.

Supplementary Note

The disclosure is not limited to the embodiments described above, and various modifications may be made within the scope of the claims. Embodiments obtained by appropriately combining technical approaches disclosed in the different embodiments also fall within the technical scope of the disclosure. Furthermore, novel technical features can be formed by combining the technical approaches disclosed in each of the embodiments.

INDUSTRIAL APPLICABILITY

The disclosure can be used in a control device for a display panel, a display device, and a control method for a display panel.

The invention claimed is:

1. A control device for a display panel, the display panel comprising:

a plurality of first self-light-emitting pixels that outputs a first color light, and a plurality of second self-light-emitting pixels that outputs a second color light different from the first color light, wherein the plurality of first self-light-emitting pixels is arranged within a predetermined range and corresponds, respectively, to the second self-light-emitting pixels among the plurality of second self-light-emitting pixels, the control device comprising:

an accumulation circuit configured to accumulate an influence quantity calculated based on a display amount related to a first self-light-emitting pixel, among the plurality of first self-light-emitting pixels, arranged within the predetermined range with respect to a second self-light-emitting pixel, among the plurality of first self-light-emitting pixels, the influence quantity indicating an influence of display of the second self-light-emitting pixel corresponding to the first self-light-emitting pixel; and a compensation processing circuit configured to generate a correction video signal by compensating for an input video signal relative to a temporal change of each of the plurality of second self-light-emitting pixels based on each respective influence quantity related to each of the plurality of second self-light-emitting pixels.

2. The control device according to claim 1, wherein each respective influence quantity related to each of the plurality of second self-light-emitting pixels is calculated based on:

a display amount related to the plurality of first self-light-emitting pixels arranged within the predetermined range, and a display amount related to the second self-light-emitting pixel.

3. The control device according to claim 1, wherein the accumulation circuit accumulates the respective influence quantity of each of the plurality of second self-light-emitting pixels in a state of outputting the second color light by-the plurality of second self-light-emitting pixels.

4. The control device according to claim 1, wherein the respective influence quantity of each of the plurality of second self-light-emitting pixels is calculated, such that as a distance between the second self-light-emitting pixel and the first self-light-emitting pixel arranged within the predetermined range increases, an influence of a display amount related to the first self-light-emitting pixel on the influence quantity decreases.

5. The control device according to claim 1, wherein the first color light has a shorter wavelength than a wavelength of the second color light, the accumulation circuit further accumulates each respective influence quantity indicating an influence of display related to each of the plurality of first self-light-emitting pixels calculated based on a display amount related to the first self-light-emitting pixel, and the compensation processing circuit generates the correction video signal by further compensating for the input video signal relative to a temporal change of each of the plurality of first self-light-emitting pixels based on each of the respective influence quantity related to each of the plurality of first self-light-emitting pixels.

6. The control device according to claim 1, wherein the first color light is blue light, and the second color light is red light or green light.

7. The control device according to claim 1, wherein the first color light has a longer wavelength than a wavelength of the second color light.

8. The control device according to claim 1, wherein the display amount comprises data related to a current amount flowing through a self-light-emitting pixel.

9. A display device comprising:

the control device according to claim 1;

the display panel; and a display control circuit configured to perform display on the display panel based on the correction video signal.

10. The display device according to claim 9, wherein the display panel further includes a sensor configured to measure a temperature of the display panel, and in the control device, the influence quantity is calculated as a large value when the temperature measured by the sensor is high.

11. The display device according to claim 10, wherein each of the plurality of first self-light-emitting pixels of the display panel includes a first self-light-emitting element, each of the plurality of second self-light-emitting pixels of the display panel includes a second self-light-emitting element, and each of the first self-light-emitting element and the second self-light-emitting element includes an organic light-emitting layer or a light-emitting layer including quantum dots.

12. A control method for a display panel, the display panel comprising:

a plurality of first self-light-emitting pixels that outputs a first color light, and a plurality of second self-light-emitting pixels that outputs a second color light different from the first color light, wherein the plurality of first self-light-emitting pixels is arranged within a predetermined range and corresponds, respectively, to the second self-light-emitting pixels among the plurality of second self-light-emitting pixels, and the control method comprising:

accumulating an influence quantity calculated based on a display amount related to a first self-light-emitting pixel, among the plurality of first self-light-emitting pixels, arranged within the predetermined range with respect to a second self-light-emitting pixel, among the plurality of first self-light-emitting pixels, the influence quantity indicating an influence of display of the second self-light-emitting pixel corresponding to the first self-light-emitting pixel; and generating a correction video signal by compensating for an input video signal relative to a temporal change of each of the plurality of second self-light-emitting pixels based on each respective influence quantity related to each of the plurality of second self-light-emitting pixels.

13. The control method for a display panel according to claim 12, wherein in the accumulating, each respective influence quantity related to each of the plurality of second self-light-emitting pixels is calculated based on: a display amount related to the plurality of first self-light-emitting pixels arranged within the predetermined range, and a display amount related to the second self-light-emitting pixel.

* * * * *